United States Patent
Hershey et al.

(10) Patent No.: US 11,816,012 B2
(45) Date of Patent: Nov. 14, 2023

(54) MULTI-DOMAIN SYSTEMS INTEGRATION AND EVALUATION

(71) Applicant: RAYTHEON COMPANY, Waltham, MA (US)

(72) Inventors: Paul C. Hershey, Ashburn, VA (US); Marcus A. Teter, Belgrade, MT (US); Vikram A. Prasad, Reston, VA (US)

(73) Assignee: RAYTHEON COMPANY, Waltham, MA (US)

( * ) Notice: Subject to any disclaimer, the term of this patent is extended or adjusted under 35 U.S.C. 154(b) by 105 days.

(21) Appl. No.: 17/500,533

(22) Filed: Oct. 13, 2021

(65) Prior Publication Data

US 2023/0112257 A1   Apr. 13, 2023

(51) Int. Cl.
*G06F 11/34* (2006.01)
*G06F 9/448* (2018.01)
*G06F 11/30* (2006.01)

(52) U.S. Cl.
CPC ........ *G06F 11/3428* (2013.01); *G06F 9/4498* (2018.02); *G06F 11/3048* (2013.01)

(58) Field of Classification Search
CPC . G06F 11/3048; G06F 11/3428; G06F 9/4498
(Continued)

(56) References Cited

U.S. PATENT DOCUMENTS 5,689,711 A   11/1997   Bardasz et al.
7,761,406 B2   7/2010   Harken
(Continued)

FOREIGN PATENT DOCUMENTS

CN   101866049 B   7/2013
CN   109074561 A   12/2018
(Continued)

OTHER PUBLICATIONS

O. Garnica, J. Lanchares and J. M. Sanchez, "Finite state machine optimization using genetic algorithms," Second International Conference On Genetic Algorithms In Engineering Systems: Innovations And Applications, 1997, pp. 283-289, doi: 10.1049/cp:19971194.
(Continued)

*Primary Examiner* — John H Le
(74) *Attorney, Agent, or Firm* — Lando & Anastasi, LLP

(57) ABSTRACT

Techniques for multi-domain systems integration and evaluation are disclosed, including: obtaining criteria associated with a strategic objective; determining that a first system, operating in a first operating domain, is only partially capable of satisfying a first criterion in the criteria; determining that a second system, operating in a second operating domain that is different from the first operating domain, is capable of augmenting the first system with respect to satisfying the first criterion; responsive to determining that the second system is capable of augmenting the first system with respect to satisfying the first criterion, modeling a multi-domain system including at least a first component from the first system and at least a second component from the second system; and generating a performance metric that objectively evaluates capabilities of the multi-domain system against the criteria associated with the strategic objective.

20 Claims, 48 Drawing Sheets

(58) Field of Classification Search
USPC .......................................................... 702/186
See application file for complete search history.

(56) References Cited

U.S. PATENT DOCUMENTS

| | | | |
|---|---|---|---|
| 7,831,693 | B2 | 11/2010 | Lai |
| 7,971,180 | B2 | 6/2011 | Kreamer et al. |
| 8,069,435 | B1 | 11/2011 | Lai |
| 8,429,597 | B2 | 4/2013 | Prigge |
| 8,538,954 | B2 | 9/2013 | George et al. |
| 8,707,261 | B2 | 4/2014 | Heller et al. |
| 8,848,731 | B2 | 9/2014 | Das et al. |
| 9,221,177 | B2 | 12/2015 | Herr et al. |
| 9,544,139 | B2 | 1/2017 | Cox et al. |
| 9,813,398 | B2 | 11/2017 | Li |
| 2003/0159105 | A1 | 8/2003 | Tiebert |
| 2008/0273682 | A1 | 11/2008 | Bakker et al. |
| 2018/0357552 | A1 | 12/2018 | Campos et al. |
| 2020/0244694 | A1* | 7/2020 | Sarkesain ........... H04L 63/1433 |

FOREIGN PATENT DOCUMENTS

| | | |
|---|---|---|
| CN | 110221546 A | 9/2019 |
| CN | 110458443 A | 11/2019 |
| CN | 110730220 A | 1/2020 |
| DE | 60223253 T2 | 11/2008 |
| JP | 5817032 B2 | 11/2015 |
| JP | 6754369 B2 | 9/2020 |
| TW | I600295 B | 9/2017 |

OTHER PUBLICATIONS

V. Hristov and G. Kalpachka, "Use of web based calculator of genetic algorithms for optimal coding the states of finite state machines," 2014 10th France-Japan/ 8th Europe-Asia Congress on Mecatronics (MECATRONICS2014—Tokyo), 2014, pp. 274-278, doi: 10.1109/MECATRONICS.2014.7018571.

W. Meilin, Z. Xiangwei and D. Qingyun, "An Integration Methodology Based on SOA to Enable Real-Time Closed-Loop MRP between MES and ERP," 2010 International Conference on Computing, Control and Industrial Engineering, 2010, pp. 101-105, doi: 10.1109/CCIE.2010.33.

Z. Tong, P. Q. Chen and W. Yao, "Research on the evaluation of enterprise knowledge integration capability based on Fussy-GRNN," 2011 IEEE 18th International Conference on Industrial Engineering and Engineering Management, 2011, pp. 347-351, doi: 10.1109/ICIEEM.2011.6035173.

L. Zhang, "Specification and Design of Cyber Physical Systems Based on System of Systems Engineering Approach," 2018 17th International Symposium on Distributed Computing and Applications for Business Engineering and Science (DCABES), 2018, pp. 300-303, doi: 10.1109/DCABES.2018.00084.

* cited by examiner

|  | COA Planning || Threat Analysis ||
|  | Gaps | Augment | Gaps | Augment |
|---|---|---|---|---|
| Sys D | • Insufficient COA Planning | • COA generation via Sys A1 /Sys A2 | • Insufficient coverage of all relevant threat effect pairings | • Sys E air-based threat effect pairings<br>• Sys A1/Sys A2 threat/effect pairings<br>• Consider Provider threat analysis capabilities & Sys G |
| Sys B | • Need high TRL COA planning | • Sys A1 /Sys A2 provides TRL 4 COA planning | • Need High TRL Land-based threat effect analysis | • Sys F includes high TRL threat/effect analysis<br>• Sys J provides TRL 6 to 7 (via Sys M program) threat/effect analysis<br>• Consider Provider threat analysis capabilities & Sys G |
| Sys A1 / Sys A2 | • Sys A1 /Sys A2 provides TRL 4 COA planning | • Need to increase TRL of overall Sys A1 /Sys A2.<br>• Sys F helps with land-domain<br>• Sys H could help with dynamic COA | • Sys A/Sys J provides TRL 6 to 7 (via Sys M program) threat effect analysis<br>• Sys A1 /Sys F includes high TRL threat-effect analysis | • Need to move analysis to real-time, Consider SCORE P (Self-healing) implementation<br>• Consider Sys G analysis<br>• Consider Sys E<br>• Sys C Sensor analysis |
| Sys C | • Looking to leverage COA planning from other Provider capabilities | • COA generation via Sys A1/Sys A2<br>• Consider Sys F<br>• Consider Sys I | • New sensor based threat detection | • Sys E could help augment threat information for land, air, space and subsurface domains |

Legend: Big Gap | Low TRL | High TRL | Research Required

FIG. 4A

| Execution Scheduler | | Long Term Planning | |
|---|---|---|---|
| Gaps | Augment | Gaps | Augment |
| • Excellent DevSecOps pipeline | • Consider Pipeline-in-a-Box (PiaB) for enhancements | • Insufficient long-term planning for COAs | • Long-term COA planning via Sys A1 IRAD |
| • Not sure. May be Vendor PiaB | • Consider using Sys D DevSecOps pipeline | • Need high TRL long-term-planner for Land | • Long-term COA planning via Sys A1 IRAD with Sys F for land-based planning |
| • Need DevSecOps pipeline | • Collaborate with Sys D for DevSecOps pipeline<br>• Consider Pipeline-in-a-Box (PiaB) for enhancements | • Long-term COA planning via Sys A1 IRAD | • Increase TRL with Sys L IRAD |
| • Further Research Required | • Further Research required | • Limited flight planning & mission planning capabilities | • Sys E, Sys A1/Sys A2 and Sys F can provide comprehensive planning capabilities |

 Big Gap    Low TRL    High TRL    Research Required

FIG. 4A CONT.

|  | SIT REP ||  Decision Aids ||
|---|---|---|---|---|
|  | Gaps | Augment | Gaps | Augment |
| Sys D | • Needs further research | • Needs further research | • Real-time | • Sys H for specific COA definitions<br>• Sys E for air domain<br>• Sys A1 /Sys A2 for multi-domain<br>• Consistent UI with Sys B & Sys A1 |
| Sys B | • Needs further research | • Needs further research | • Needs Higher TRL service to integrate | • Sys F for land-based<br>• Sys A1 /Sys A2 for multi-domain<br>• Consistent UI with Sys D & Sys A1 |
| Sys A1 / Sys A2 | • Capability exists but only in wireframe for COA compare UI. Thus, low TRL | • Implement report generation portion of COA Compare screen that is in wireframe now | • Sys L is a multi-domain COA decision aid. Needs higher TRL Air, Sea, Space and Cyber | • Sys E for Air domain<br>• Sys K space Protection COA<br>• Sys H for dynamic<br>• Consistent UI with Sys B & Sys D |
| Sys C | • Limited to Maritime domain | • Sys E and Sys A1/Sys A2 could augment for other domains | • Limited UI/Visualization capability in 1st release | • Could leverage Sys A1 / Sys A2<br>• Consider Sys E<br>• Consider Sys G<br>• Consider Sys F |

FIG. 4B

| Scheduled ASSET Availability Concentrator | | Real Time ASSET Availability Concentrator | |
|---|---|---|---|
| Gaps | Augment | Gaps | Augment |
| • Need High TRL schedule service | • Investigate Sys K Space Protection COA (TDM Scheduler)<br>• Could try to use Sys F | • Does not have this capability now | • Consider real-time COA generation w Sys A1/ Sys A2 and SCOAR implementation<br>• Consider Sys H |
| • Need High TRL schedule service | • Could try to use Sys F<br>• Consider XDM (mostly or space)<br>• Consider Sys A1 scheduler – SW implemented at TRL6 for COA development. | • Does not have this capability now | • Consider real-time COA generation w Sys A1/ Sys A2 and SCOAR. Need to increase TRL with IRAD implementation<br>• Consider Sys H |
| • Asset scheduler exists but is manual | • Automate asset scheduler with AI/ML. Integrate AI/ML Asset Optimizer | • Does not have this capability now | • Add real-time COA generation w Sys A1/ Sys A2 and SCOAR with to increase TRL using with IRAD funds implementation<br>• Consider Sys H |
| • Further Research Required | • Use Sys A1 / Sys A2 Asset Optimizer<br>• Sys E could be leveraged as well | • Further Research Required | • Use Sys A1 / Sys A2 Asset Optimizer<br>• Sys E could be leveraged as well |

FIG. 4B CONT.

| | Asset Attributes Library Concentrator | |
|---|---|---|
| | Gaps | Augment |
| Sys D | • Verify that data ontology for asset library is sufficient. | • Investigate Sys B and Sys A1/Sys A2 data ontologies |
| Sys B | • Verify that data ontology for asset library is sufficient.<br>• Build asset library with relevant data | • Investigate Sys A1 /Sys A2 data ontology |
| Sys A1 / Sys A2 | • Verify that data ontology for asset library is sufficient.<br>• Build asset library with relevant data | • Investigate Sys B data ontology |
| Sys C | • Further Research Required | • Sys E for defining assets for air, space, ground and subsurface<br>• Sys F for all domains |

FIG. 4C

| Mission Definition API Concentrator | | Training | |
|---|---|---|---|
| Gaps | Augment | Gaps | Augment |
| • Air Force domain only. API may not exist | • Sys E could help with Air Domain | • Needs further research | • Needs further research |
| • Army domain (includes Land, Air, Sea, Space & Cyber) only. API may not exist | • Sys F could help with land-domain<br>• Sys E could help with Air Domain | • Needs further research | • Needs further research |
| • Included in multi-domain mission analysis. However, API for mission definition creation does not exist | • Sys F could help with land-domain<br>• Sys E could help with air domain | • Add white cell to Sys A1 wargame | • Use Project A opportunity to fund white cell addition and higher TRL FOR Sys A1/Sys A2 |
| • Further Research Required | • Sys A1 / Sys A2 planning capability<br>• Sys F mission planning<br>• Sys E Mission Planning<br>• Sys G Mission Planning | • Further Research Required | • Sys F's training delivery<br>• Sys A1 / Sys A2 (Cust. considering for training) |

FIG. 4C CONT.

|       | COA Planning | | Threat Analysis | |
|---|---|---|---|---|
|       | Gaps | Augment | Gaps | Augment |
| Sys H | • Excellent COA planning for large number of options | • COA scaling generation via Sys A1 /Sys A2 | • Sys E air-based threat | • Sys A1/Sys A2 threat/effect pairings<br>• Consider Provider threat analysis capabilities & Sys G |
| Sys G | • Can model COA chain for all domains | • COA scaling generation via Sys A1 /Sys A2 | • Further Research Required | • Further Research Required |
| Sys E | • No COA Planning | • COA scaling generation via Sys A1 /Sys A2 | • The processor has its own perception of threats | • Investigate Sys B<br>• Investigate Sys G |
| Sys F | • Excellent COA planning capability for all domains | • COA scaling generation via Sys A1 /Sys A2 | • Mission Planner can model threat COAs for risk areas | • Sys A1/Sys A2 threat/effect pairings<br>• Consider Provider threat analysis capabilities & Sys G |

FIG. 4D

| Execution Scheduler | | Long Term Planning | |
|---|---|---|---|
| Gaps | Augment | Gaps | Augment |
| • Further Research Required | • Consider Pipeline-in-a-Box (PiaB) for enhancements | • Planning for COAs has a multitude of options that may be inefficient in long term | • Long-term COA planning via Sys A1 IRAD |
| • Further Research Required | • Further Research Required | • Further Research Required | • Further Research Required |
| • Further Research Required | • Further Research Required | • Has limited Reactive Planning Architecture framework | • Investigate Sys A1/Sys A2 |
| • Further Research Required | • Further Research Required | • provides strategic planning, rapid COA development and wargaming, easy to use map-based mission planning | • Investigate Sys A1/Sys A2 |

FIG. 4D CONT.

|  | SIT REP | | Decision Aids | |
|---|---|---|---|---|
|  | Gaps | Augment | Gaps | Augment |
| Sys H | • Needs further research | • Needs further research | • Real-time creations of many COA | • Sys H for specific COA definitions<br>• Sys E for air domain<br>• Sys A1 /Sys A2 for multi-domain<br>• Consistent UI with Sys B & Sys A1 |
| Sys G | • Further Research Required | • Further Research Required | • Custom analytics capabilities exist but visualization needs to be constructed | • Could leverage Sys A1 / Sys A2 |
| Sys E | • Further Research Required | • Further Research Required | • Decision aids exist but has opportunity to be augmented | • Investigate Sys H, Sys G and Sys A1/Sys A2 |
| Sys F | • Further Research Required | • Further Research Required | • decision aids that enable faster decision-making through situational assessment<br>• Accelerates the planning process and synchronizing planning and execution | • Investigate Sys A1/Sys A2 |

FIG. 4E

| Scheduled ASSET Availability Concentrator | | Real Time ASSET Availability Concentrator | |
|---|---|---|---|
| Gaps | Augment | Gaps | Augment |
| • Needs further research | • Investigate Sys K Space Protection COA (TDM Scheduler)<br>• Could try to use Sys F | • Needs further research | • Consider real-time COA generation w Sys A1/ Sys A2 and SCOAR implementation<br>• Consider Sys H |
| • Further Research Required | • Further Research Required | • Further Research Required | • Further Research Required |
| • Capability exists for air domain assets | • Investigate possible augmentation with Sys A1/Sys A2, Sys B, Sys D and Sys G | • Excellent air domain asset availability exists | • Could be augmented with other M&S Tools |
| • Multi-domain asset availability | • Investigate Sys E, Sys B and Sys G for domain specific asset addition | • Further Research Required | • Further Research Required |

FIG. 4E CONT.

| | Mission Definition API Concentrator | | Training | |
|---|---|---|---|---|
| | Gaps | Augment | Gaps | Augment |
| | • Multi-domain | • Sys F could help with Air Domain | • Needs further research | • Needs further research |
| | • Further Research Required | • Further Research Required | • Further Research Required | • Further Research Required |
| | • Further Research Required | • Further Research Required | • Air domain only | • Investigate Sys F, Sys G and Sys H |
| | • Multi-domain | • Investigate Sys E, Sys G & Sys B | • simulates and visualizes air operations in support of synchronizing operations, rehearsals during preparation, and training/exercises | • Investigate Sys E, Sys G and Sys B |

FIG. 4F CONT.

Detailed Trade Study 500

| Design Criteria | | |
|---|---|---|
| Design Criterion 502 | Time to Integrate | Ease of Integration |
| | 10 = Minimal time to integrate<br>5 = Medium<br>1 - High | 10 = Easy<br>6 = Medium<br>1 - Complex |
| Criteria Weighting (10 -> 1 for highest to lowest importance) | 6 | 9 |
| 1. Sys A2 | 7 | 7 |
| Criterion Weight 606 | • Already integrated with Sys A1 as part of Program B demo | • Already integrated with Sys A1 as part of Program B demo |
| Weighted Score | 42 | 63 |
| 2. Sys B | 5 | 7 |
| Raw Score 604<br><br>Note Field 612<br><br>Weighted Score 608 | • Expects high TRL service to integrate - Sys L is at best TRL 6, thus won't integrate until end of year<br>• Includes following common components: Sys J and Create models for analysis, Sys A2, Sys A1 UI (uses VUE framework rather than Cesium). Open architecture, Army COAs, Applicable CONOPs and scenario | • Includes following common components: Sys J and Create models for analysis, Sys A2, Sys A1 UI (uses VUE framework rather than Cesium)<br>• Open architecture, Army COAs, Applicable CONOPs and scenario. Thus, relatively easy to integrate |
| Weighted Score | 30 | 63 |

FIG. 5A

Detailed Trade Study 500

| Design Criteria | | | |
|---|---|---|---|
| User Experience/Usability | Analytics Support | Deployment Flexibility | Costs |
| 10 = Vetted operational in accepted framework<br>5 = Prototype UI<br>1 - Concept/Minimal UI | 10 = Exist as a Service for MOEs, MOPs relevant to Commanders intent<br>1 = Non Normalized Simulation Results | 10 = Versatile deployment options including Cloud, on Prem, Virtual etc.<br>1 = Stand Alone Only | 10 = Low cost to integrate<br>5 = Work required to integrate<br>1 = Labor intensive effort |
| 8 | 5 | 7 | 4 |
| 7 | 7 | 9 | 7 |
| • Good Interface but need a unified UI | • Need to be able to integrate with Sys A1 analytics framework | • Architectured to have maximum flexibility with regard to deployment. In terms of picking and choosing analytics and whether they are deployed AWS, a private cloud or stand alone application. | • Already integrated with Sys A1 as part of Program B demo |
| 56 | 35 | 63 | 28 |
| 7 | 6 | 7 | 5 |
| • Sys A1 UI (uses Cesium framework rather than VUE). Sys L is migrating to VUE FW for new UI screens | • Sys J and Sys M models for analysis and Sys A2 analysis are part of Sys L and compatible with Sys B | • Sys L and Sys B can be deployed stand-alone or over the network i.e. Cloud | • Sys B and Sys L are at the start of programs. Thus, cost to integrate is uncertain |
| 56 | 30 | 49 | 20 |

FIG. 5A CONT.

Detailed Trade Study 500

| Design Criteria | | | | Score |
|---|---|---|---|---|
| Modeling of assets (SAM's, GEO sats etc.) | COA Modelling | Data Architecture | Gaps | |
| 10 = Modeling of assets in all domains at sufficient fidelity<br><br>1 = Modeling of assets in some! domains at various levels of fidelity | 10 = COA Modeling available OR equivalent Mission Modeling<br><br>1 = No COA modeling OR Mission Planning available | 6 to 10 = Multi-data source ingestion onto a unified data ontology<br><br>1 to 5 = Multi-data source ingestion onto a single data ontology | - What Sys L can do for Provider Related capabiliti and<br><br>- Whatever Provider Relat Capabilities can do for Sys L | |
| 6 | 6 | 8 | | |
| 6 | 3 | 8 | User Interface with Sys A1<br>Extent of Sys A2 deployment over Cloud<br>Additional asset models may be required | |
| • Additional asset models for scenarios for considerations | • relies on Sys A1 for COA modeling | • Solid data model, but unification aspects still needs considerations | | |
| 36 | 18 | 64 | | 405 |
| 6 | 6 | 6 | Sys A1 UI needs full integration to VUE<br>Additional asset models for Sys A1 to cover Sys B requirements<br>Require higher TRL DevSecOps pipeline by Sys B to add Sys A1 micro-services | |
| • Sys J and Sys M asset models for analysis and Sys A2 asset models for analysis are part of Sys L and compatible with Sys B | • Sys J and Sys A1 UI models for analysis and compare are part of Sys L and compatible with Sys B | • Sys B data model compatible with original Sys A1 data model and Sys A2 Data Model | | |
| 36 | 36 | 48 | | 368 |

FIG. 5A CONT.

610 Total Score

Detailed Trade Study 500

| | | Time to Integrate | Ease of Integration |
|---|---|---|---|
| | | 10 = Minimal time to integrate<br>5 = Medium<br>1 = High | 10 = Easy<br>6 = Medium<br>1 = Complex |
| | Criteria Weighting (10 -> 1 for highest to lowest importance) | 6 | 9 |
| Provider Related Capabilities | 3. ABMS Virtual Prototype (Sys C) | 6 | 7 |
| | | • Lower TRL service acceptable, thus integration can begin soon<br>• Both support ABMS and JADC2 scenarios. Looking for DevSecOps, AI/ML microservices, mission effectiveness, data ontologies for multiple diverse systems, flight planning | • Provider VP looking integrate 3 AI/ML services from Sys L - SVC L1, Asset Optimizer, Anomaly Detection |
| | Weighted Score | 36 | 63 |
| | 4. Sys D | 5 | 6 |
| | | • Sys D supports ABMS program - Provider effort called PROG D1. Sys D resource management problem - maintain tracking and surveillance of 1000s of targets. Sys L provides scalable micro-serrvices. Integration depends on DEVSECOPS approach | • Looking to integrate Sys L AI/ML microservice through well-developed Sys D DevSecOps pipeline |
| | Weighted Score | 30 | 54 |

FIG. 5B

Detailed Trade Study 500 

| User Experience/Usability | Analytics Support | Deployment Flexibility |
|---|---|---|
| 10 = Vetted operational in accepted framework<br>5 = Prototype UI<br>1 = Concept/Minimal UI | 10 = Exist as a Service for MOEs, MOPs relevant to Commanders intent<br>1 = Non Normalized Simulation Results | 10 = Versatile deployment options including Cloud, on Prem, Virtual etc.<br>1 = Stand Alone Only |
| 8 | 5 | 7 |
| 5 | 6 | 5 |
| • GUIs differ. However, Sys A1 GUI is candidate | • Context sensitive (Sys L - SVC L2 connection) to support Vendor VP context sensitive analysis.) | • Sys L and Vendor Virtual Prototype can be deployed stand-alone OR on Cloud |
| 40 | 30 | 35 |
| 8 | 6 | 7 |
| • PROG D1 is using Sys A1 UI with VUE framework. Sys L is creating all new UI screens in VUE | • Sys J and Sys M models for analysis and Sys A2 models for analysis provide high fidelity results that may/may not be useful for Sys D | • Sys L and Sys D can be deployed stand-alone OR on Cloud |
| 64 | 30 | 49 |

FIG. 5B CONT.

Detailed Trade Study 500

| Costs | Modeling of assets (SAM's, GEO sats etc.) | COA Modeling |
|---|---|---|
| 10 = Low cost to integrate<br>5 = Work required to integrate<br>1 = Labor intensive effort | 10 = Modeling of assets in all domains at sufficient fidelity<br>1 = Modeling of assets in some1 domains at various levels of fidelity | 10 = COA Modeling available OR equivalent Mission Modeling<br>1 = No COA modeling OR Mission Planning available |
| 4 | 6 | 6 |
| 6 | 7 | 7 |
| • Sys L and RIS Virtual Prototype are smaller programs. Both can be influenced by the other to reduce costs | • Sys L asset models can be integrated as microservices through DevSecOps pipeline for Vendor Virtual Prototype | • Sys L COA models, including SVC L1 genetic algorithm for flight planning analysis model, Sys L UUV, and UAS models could be useful to Vendor VP |
| 24 | 42 | 42 |
| 5 | 7 | 7 |
| • Sys D is at start of program. Thus, cost to integrate is uncertain | • Sys L asset models can be integrated as microservices through DEVSECOPS pipeline for Sys D | • Sys L COA models, including SVC L1 genetic algorithm for flight planning analysis model, Sys L UUV, and UAS models could be useful to Sys D |
| 20 | 42 | 42 |

FIG. 5B CONT.

Detailed Trade Study 500

| Data Architecture | Gaps | Score |
|---|---|---|
| 6 to 10 = Multi-data source ingestion onto a unified data ontology<br>1 to 5 = Multi-data source ingestion onto a single data ontology | - What Sys L can do for Provider-Related capabilities and<br>- Whatever Provider-Related Capabilities can do for Sys L | |
| 8 | | |
| 5<br>• May not be compatible with original Sys A1 data model and Sys A2 Data Model<br>• Data availability and orchestration - Possible Sys L-SVC L2 AI/ML connection wrt Re-enforcement learning | Require higher TRL DevSecOps pipeline by Vendor VP to add Sys A1 micro-services (AI/ML)<br>Additional asset models for Sys A1 to cover Vendor VP requirements<br>Provider VP Prototype /Sys A1 UI needs full integration to VUE | |
| 40 | | 352 |
| 5<br>• May be compatible with original Sys A1 data model and Sys A2 Data Model | Require higher TRL DevSecOps pipeline by Sys D to add Sys A1 micro-services (AI/ML)<br>Additional asset models for Sys A1 to cover Sys D requirements<br>Sys D Prototype Sys A1 UI needs full integration to VUE | |
| 40 | | 371 |

FIG. 5B CONT.

| Design Criteria | | |
|---|---|---|
| | Time to Integrate | Ease of Integration |
| | 10 = Minimal time to integrate<br>5 = Medium<br>1 = High | 10 = Easy<br>6 = Medium<br>1 = Complex |
| Criteria Weighting (10 -> 1 for highest to lowest importance) | 6 | 9 |
| 5. AF SIM | 3 | 3 |
| | • Past integration efforts have posed challenges on DIS<br>• HLA release will mitigate this -Planned May 2021 | • Extensions & plugins will help with integrations but are not easy<br>• Training is available through various delivery content |
| Weighted Score | 18 | 27 |
| 6. Sys F | 8 | 8 |
| | • Integrated with Sys A1 already in the past | • Can integrate simulations through DIS or HLA to DIS gateway. Live data links can be utilized as well<br>• Interface adapters (like plugins); operationally Sys F supports all types of protocols, VMF, USMTF, Jseries |
| Weighted Score | 48 | 72 |

Detailed Trade Study 500

FIG. 5C

Detailed Trade Study 500

| Design Criteria | | |
|---|---|---|
| User Experience/Usability | Analytics Support | Deployment Flexibility |
| 10 = Vetted operational in accepted framework<br>5 = Prototype UI<br>1 = Concept/Minimal UI | 10 = Exist as a Service for MOEs, MOPs relevent to Commanders intent<br>1 = Non Normalized Simulation Results | 10 = Versatile deployment options including Cloud, on Prem, Virtual etc.<br>1 = Stand Alone Only |
| 8 | 5 | 7 |
| 8 | 7 | 1 |
| • Playback capability called [name]; platform interaction with weapons & sensors can be visualized<br>• Operational on many programs<br>• Integration with Sys A1 will offer greater level of fidelity in visualization | • Generates metrics for every event<br>• Scripting enables Sys A1 integartion to integrate analytics and visualize them | • Cannot be installed on a Cloud<br>• Only stand alone machine installations |
| 64 | 35 | 7 |
| 9 | 5 | 4 |
| • Operational on multiple programs with a high TRL of Sys F --> 8 and Sys N --> 9 | • Only recording playback available on Sys N<br>• Post simulation data is available in raw format and needs processing | • Cloud capability not yet confirmed but could be deployed on Cloud - extra work to host it on a cloud |
| 72 | 25 | 28 |

FIG. 5C CONT.

Detailed Trade Study 500

| Design Criteria | | |
|---|---|---|
| Costs | Modelling of assets (SAM's, GEO sats etc.) | COA Modeling |
| 10 = Low cost to integrate<br>5 = Work required to integrate<br>1 = Labor intensive effort | 10 = Modeling of assets in all domains at sufficient fidelity<br>1 = Modeling of assets in somel domains at various levels od fidelity | 10 = COA Modeling available OR equivalent Mission Modeling<br>1 = No COA modeling OR Mission Planning available |
| 4 | 6 | 6 |
| 5 | 7 | 4 |
| • Given that past integrations have been challenging, Sys A1 integration could be no different<br>• While past integrations have been successful, Sys A1 integration investment could pay off in the long run | • Variety of air, ground, space, sub surface and land assets can be modeled<br>• Some assets can be modeled at a very high level of fidelity | • No COA Modeling available per se but limited mission planning is available |
| 20 | 42 | 24 |
| 9 | 5 | 9 |
| • Relatively low risk and effort with Sys A1 integration<br>• Leverages prior experience with Sys A1 integration | • Can model high level Units<br>• Cannot model all domains into individual asset level (only some domains) | • Has COA modeling capability |
| 36 | 30 | 54 |

FIG. 5C CONT.

Detailed Trade Study 500

| Design Criteria | | |
|---|---|---|
| Data Architecture | Gaps | Score |
| 6 to 10 = Multi-data source ingestion onto a unified data ontology<br>1 to 5 = Multi-data source ingestion onto a single data ontology | - What Sys L can do for Provider Related capabilities and<br>- Whatever Provider Related Capabilities can do for Sys L | |
| 8 | | |
| 4<br>• Delivered with a standard fusion engine<br>• Can handle Streaming data<br>• Need a parser for external files - no built in capability<br><br>32 | * Need to await HLA compliant release for easing integration efforts<br><br>* Lack of cloud Deployment<br><br>* Does not have COA modeling but it is offset by Sys A1's COA modeling capability | 269 |
| 7<br>• Has data mediation capability that can take in different formats. Everything is eventually converted to JSON.<br><br><br><br>56 | * MCOO automation is a big gap that needs to be fulfilled for successful long term integration. Current manual MCOO framework is untenable for programs | 421 |

FIG. 5C CONT.

Detailed Trade Study 500

| | | Time to Integrate | Ease of Integration |
|---|---|---|---|
| | | 10 = Minimal time to integrate<br>5 = Medium<br>1 = High | 10 = Easy<br>6 = Medium<br>1 = Complex |
| | Criteria Weighting (10 -> 1 for highest to lowest) | 6 | 9 |
| Provider Related Capabilities | 7. Sys G | 9 | 9 |
| | | •Has integrated into Sys O and Sys D - Easy to medium integration Only<br>•caveat is, for easy integration, need SW Developers from Sys G to integrate it. | •High fidelity plugins enable easy integration and has proven experience with ASW |
| | Weighted Score | 54 | 81 |
| | 8. Sys H | 7 | 4 |
| | | •Integrated into ABMS ecosystem within months. | •IL4 and IL6 integration |
| | Weighted Score | 42 | 36 |

FIG. 5D

Detailed Trade Study 500

| Design Criteria | | | |
|---|---|---|---|
| User Experience/Usability | Analytics Support | Deployment Flexibility | Costs |
| 10 = Vetted operational in accepted framework<br>5 = Prototype UI<br>1 = Concept/Minimal UI | 10 = Exist as a Service for MOEs, MOPs relevant to Commanders intent<br>1 = Non Normalized Simulation Results | 10 = Versatile deployment options including Cloud, on Prem, Virtual etc.<br>1 = Stand Alone Only | 10 = Low cost to integrate<br>5 = Work required to integrate<br>1 = Labor intensive effort |
| 8 | 5 | 7 | 4 |
| 6 | 5 | 9 | 6 |
| • Has proven experience on ASW<br>• Compatibility of UI framework is uncertain | • Has analytics that customers can use - built in python scripts that generates the metrics but customization is available | • Accommodates both cloud and stand-alone. Highly flexible | • Relatively easy integration with Sys A1<br>• Need to budget for some SW developer's time from Sys G |
| 48 | 25 | 63 | 24 |
| 3 | 7 | 9 | 5 |
| • Existing engineering UI<br>• Hypergiant driving construction of UI display for ABMS | • Virtual Liason agents using library of Hierarchical Task Network plays to generate options across multiple domains.<br>• Means of ranking options<br>• Adapt and repair COA with new targets and plan perturbations | • Accommodates both via platformONE, IL4 and IL6 | • Uncertain how IL4 and IL6 plugin integration is uncertain at this time |
| 24 | 35 | 63 | 20 |

FIG. 5D CONT.

Detailed Trade Study 500

| Modeling of assets (SAM's, GEO sats etc.) | COA Modeling | Data Architecture |
|---|---|---|
| 10 = Modeling of assets in all domains at sufficient fidelity<br>1 = Modeling of assets in somel domains at various levels of fidelity | 10 = COA Modeling available OR equivalent Mission Modeling<br>1 = No COA modeling OR Mission Planning available | 6 to 10 = Multi-data source ingestion onto a unified data ontology<br>1 to 5 = Multi-data source ingestion onto a single data ontology |
| 6 | 6 | 8 |
| 7 | 5 | 5 |
| • Can model Satellites, Sensors, communication networks etc.<br>• Sys A1/Sys G asset models compatibility?? | • Can model COA chain<br>• Can Sys G model JP5-0 and MDMP COA process?? | • Can accommodate any data source for integration<br>• Python based framework allows flexibility for customizing any kind of data source |
| 42 | 30 | 40 |
| 7 | 8 | 4 |
| • Domanin specific languages for plays<br>• All models and capabilities specified as UDL json message | • COA modeling mian capability<br>• Evaluates 1000s of COAs<br>• Adapt COAs for plan purturbations | • DARPA STITCHES<br>• UDL json |
| 42 | 48 | 32 |

FIG. 5D CONT.

Detailed Trade Study
500

| Gaps | Score |
|---|---|
| - What Sys L can do for Provider Related capabilities and<br>- Whatever Provider Related Capabilities can do for Sys L | |
| Biggest gap is in the development of analytics and data architecture. Need to create an ingest mechanism into Sys A1 that can extract the post simulated Sys G data and develop and visualize metrics in Sys A1 | 407 |
| Definition of COA may differ between Sys H & Sys L<br><br>Sys L application to PlatformONE not as advanced as Sys H<br><br>Sys H UI not directly compatible with VUE<br><br>Unclear on costs to integrate Sys H & Sys L<br><br>Data Models may not be compatible with Sys L<br><br>Although Sys H scales to 1000s of COA, the approach to real dynamic COA generation during mission execution appears to differ | 342 |

FIG. 5D CONT.

| | | Time to Integrate | Ease of Integration |
|---|---|---|---|
| | | 10 = Minimal time to integrate<br>5 = Medium<br>1 = High | 10 = Easy<br>6 = Medium<br>1 = Complex |
| | Criteria Weighting (10 -> 1 for highest to lowest importance) | 6 | 9 |
| Provider Related Capabilities | 1. Sys A2 | 7 | 7 |
| | Weighted Score | 42 | 63 |
| | 2. Sys B | 5 | 7 |
| | Weighted Score | 30 | 63 |
| | 3. ABMS Virtual Prototype (Sys C) | 6 | 7 |
| | Weighted Score | 36 | 63 |
| | 4. Sys D | 5 | 6 |
| | Weighted Score | 30 | 54 |
| | 5. Sys E | 3 | 3 |
| | Weighted Score | 18 | 27 |
| | 6. Sys F | 8 | 8 |
| | Weighted Score | 48 | 72 |
| | 7. Sys G | 9 | 9 |
| | Weighted Score | 54 | 81 |
| | 8. Sys H | 7 | 4 |
| | Weighted Score | 42 | 36 |

Trade Study Summary 600

FIG. 6

| Design Criteria | | | |
|---|---|---|---|
| User Experience/Usability | Analytics Support | Deployment Flexibility | Costs |
| 10 = Vetted operational in accepted framework<br>5 = Prototype UI<br>1 = Concept/Minimal UI | 10 = Exist as a Service for MOEs, MOPs relevant to Commanders intent<br>1 = Non Normalized Simulation Results | 10 = Versatile deployment options including Cloud, on Prem, Virtual etc.<br>1 = Stand Alone Only | 10 = Low cost to integrate<br>5 = Work required to integrate<br>1 = Labor intensive effort |
| 8 | 5 | 7 | 4 |
| 7 | 7 | 9 | 7 |
| 56 | 35 | 63 | 28 |
| 7 | 6 | 7 | 5 |
| 56 | 30 | 49 | 20 |
| 5 | 6 | 5 | 6 |
| 40 | 30 | 35 | 24 |
| 8 | 6 | 7 | 5 |
| 64 | 30 | 49 | 20 |
| 8 | 7 | 1 | 5 |
| 64 | 35 | 7 | 20 |
| 9 | 5 | 4 | 9 |
| 72 | 35 | 28 | 36 |
| 6 | 5 | 9 | 6 |
| 48 | 25 | 63 | 24 |
| 3 | 7 | 9 | 5 |
| 24 | 35 | 63 | 20 |

Trade Study Summary 600

FIG. 6 CONT.

| Modeling of assets (SAM's, GEO sats etc.) | COA Modeling | Data Architecture | Score |
|---|---|---|---|
| 10 = Modeling of assets in all domains at sufficient fidelity  1 = Modeling of assets in somel domains at various levels od fidelity | 10 = COA Modeling available OR equivalent Mission Modeling  1 = No COA modeling OR Mission Planning available | 6 to 10 = Multi-data source ingestion onto a unfiled data ontology  1 to 5 = Multi-data source ingestion onto a single data ontology | |
| 6 | 6 | 8 | |
| 6 | 3 | 8 | |
| 36 | 18 | 64 | 405 |
| 6 | 6 | 6 | |
| 36 | 36 | 48 | 368 |
| 7 | 7 | 5 | |
| 42 | 42 | 40 | 352 |
| 7 | 7 | 5 | |
| 42 | 42 | 40 | 371 |
| 7 | 4 | 4 | |
| 42 | 24 | 32 | 269 |
| 5 | 9 | 7 | |
| 30 | 54 | 56 | 421 |
| 7 | 5 | 5 | |
| 42 | 30 | 40 | 407 |
| 7 | 8 | 4 | |
| 42 | 48 | 32 | 342 |

Trade Study Summary 600

FIG. 6 CONT.

| Products | Threat Analysis - Sys A1 | Threat Analysis - Sys C | Threat Analysis - Sys E | Threat Analysis - Sys F |
|---|---|---|---|---|
| Sys A1/ Sys A2 | f = F(ASys A1,ASys A1;G2) | f = F(ASys A1,ASys C;G2) | f = F(ASys A1,ASys E;G2) | f = F(ASys A1,ASys F;G2) |
| Sys C | f = F(ASys C,ASys A1;G2) | f = F(ASys C,ASys C;G2) | f = F(ASys C,ASys E;G2) | f = F(ASys C,ASys F;G2) |
| Sys H | f = F(ASys H,ASys A1;G2) | f = F(ASys H,ASys C;G2) | f = F(ASys H,ASys E;G2) | f = F(ASys H,ASys F;G2) |
| Sys E | f = F(ASys E,ASys A1;G2) | f = F(ASys E,ASys C;G2) | f = F(ASys E,ASys E;G2) | f = F(ASys E,ASys F;G2) |
| Sys F | f = F(ASys F,ASys A1;G2) | f = F(ASys F,ASys C;G2) | f = F(ASys F,ASys E;G2) | f = F(ASys F,ASys F;G2) |

| Products | Decision Aids - Sys H | Decision Aids - Sys F | Scheduled Asset Availability - Sys F |
|---|---|---|---|
| | 2 | | 3 |
| Sys A1/ Sys A2 | f = F(ASys A1, ASys H; G6) | f = F(ASys A1, ASys F; G6) | f = F(ASys A1, ASys F; G7) |
| Sys C | f = F(ASys C, ASys H; G6) | f = F(ASys C, ASys F; G6) | f = F(ASys C, ASys F; G7) |
| Sys H | f = F(ASys H, ASys H; G6) | f = F(ASys H, ASys F; G6) | f = F(ASys H, ASys F; G7) |
| Sys E | f = F(ASys E, ASys H; G6) | f = F(ASys E, ASys F; G6) | f = F(ASys E, ASys F; G7) |
| Sys F | f = F(ASys F, ASys H; G6) | f = F(ASys F, ASys F; G6) | f = F(ASys F, ASys F; G7) |

FIG. 10 CONT.

| Products | Real-Time Asset Availability - Sys E | Asset Attributes Library - Sys F |
|---|---|---|
| Sys A1/ Sys A2 | f = F(ASys A1, ASys E; G8) | f = F(ASys A1, ASys F; G9) |
| Sys C | f = F(ASys C, ASys E; G8) | f = F(ASys C, ASys F; G9) |
| Sys H | f = F(ASys H, ASys E; G8) | f = F(ASys H, ASys F; G9) |
| Sys E | f = F(ASys E, ASys E; G8) | f = F(ASys E, ASys F; G9) |
| Sys F | f = F(ASys F, ASys E; G8) | f = F(ASys F, ASys F; G9) |

FIG. 10 CONT.

|  | 1 | | | | 2 | | 3 | 4 | 5 |
|---|---|---|---|---|---|---|---|---|---|
|  | Threat Analysis - Sys A1 | Threat Analysis - Sys C | Threat Analysis - Sys E | Threat Analysis - Sys F | Decision Aids - Sys H | Decision Aids - Sys F | Scheduled Asset Availability - Sys F | Real-Time Asset Availability - Sys E | Asset Attributes Library - Sys F |
| Sys A1/Sys A2 | 0.65 | 0.7 | 0.25 | 0.9 | 0.9 | 0.85 | 0.1 | 0.1 | 0.4 |
| Sys C | 0.7 | 0.45 | 0.65 | 0.1 | 0.8 | 0.05 | 0.15 | 0.19 | 0.3 |
| Sys H | 0.65 | 0.45 | 0.4 | 0.05 | 0.9 | 0.25 | 0.005 | 0.18 | 0.2 |
| Sys E | 0.8 | 0.75 | 0.5 | 0.4 | 0.1 | 0.45 | 0.5 | 0.7 | 0.7 |
| Sys F | 0.7 | 0.4 | 0.3 | 0.3 | 0.9 | 0.5 | 0.6 | 0.3 | 0.9 |

MULTI-DOMAIN SYSTEMS INTEGRATION AND EVALUATION

BACKGROUND

As the complexity of computer systems increases, including systems of systems (SoS), the creators and users of such systems face significant challenges that demand solutions beyond prior approaches from traditional systems engineering. Such complex systems include, but are not limited to, commercial and military systems that may span multiple physical and/or virtual operating domains (e.g., two or more of land, sea, air, space, and/or one or more regions of cyberspace).

For example, in the military context, effectively confronting threats from high-tech adversaries may require an advanced SoS that coordinates combat across multiple battlefield domains (for example, coordinating land and air operations). Coordinating systems across a multi-domain battlespace environment may be referred to as Joint All Domain Command and Control (JADC2).

Different systems may satisfy different portions of a given strategic objective (e.g., a military objective, commercial objective, or other kind of strategic objective). However, successfully merging these individual systems—which often were developed independently and for different operating domains—is a monumental task. Traditional approaches rely on subject matter expertise without providing objective metrics for evaluating the different approaches available for addressing the strategic objective.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to integrating and evaluating capabilities across multiple systems in different operating domains.

SUMMARY

In general, in one aspect, one or more non-transitory computer-readable media store instructions that, when executed by one or more processors, cause the one or more processors to perform operations including: obtaining multiple criteria associated with a strategic objective; determining that a first system, operating in a first operating domain, is only partially capable of satisfying a first criterion in the multiple criteria; determining that a second system, operating in a second operating domain that is different from the first operating domain, is capable of augmenting the first system with respect to satisfying the first criterion; responsive to determining that the second system is capable of augmenting the first system with respect to satisfying the first criterion, modeling a first multi-domain system including at least a first component from the first system and at least a second component from the second system; and generating a first performance metric that objectively evaluates capabilities of the first multi-domain system against the multiple criteria associated with the strategic objective.

Generating the first performance metric may include applying a merger function to generate a metric that indicates an extent to which merging capabilities of the first system with capabilities of the second system satisfies the first criterion. Generating the first performance metric may include: generating a state machine in which transitions between states represent integrations between components in the first multi-domain system; and computing a probability of successful transition along a path from a first state of the state machine associated with the first component to a second state of the state machine associated with the second component. The operations may further include: applying a threshold function to determine whether the probability of successful transition from the first state to the second state satisfies at least one threshold condition. The threshold function may be a composite threshold function based on at least two criteria in the multiple criteria.

The operations may further include: modeling a second multi-domain system including at least a third component from a third system; and generating a second performance metric that objectively evaluates capabilities of the second multi-domain system against the multiple criteria associated with the strategic objective. The second multi-domain system may further include the first component from the first system and the second component from the second system.

The operations may further include: performing a sensitivity analysis to objectively determine variability in the first performance metric based on projected variability of at least one input to the first multi-domain system.

In general, in one aspect, a system includes at least one device including a hardware processor. The system is configured to perform operations including: obtaining multiple criteria associated with a strategic objective; determining that a first system, operating in a first operating domain, is only partially capable of satisfying a first criterion in the multiple criteria; determining that a second system, operating in a second operating domain that is different from the first operating domain, is capable of augmenting the first system with respect to satisfying the first criterion; responsive to determining that the second system is capable of augmenting the first system with respect to satisfying the first criterion, modeling a first multi-domain system including at least a first component from the first system and at least a second component from the second system; and generating a first performance metric that objectively evaluates capabilities of the first multi-domain system against the multiple criteria associated with the strategic objective.

Generating the first performance metric may include applying a merger function to generate a metric that indicates an extent to which merging capabilities of the first system with capabilities of the second system satisfies the first criterion. Generating the first performance metric may include: generating a state machine in which transitions between states represent integrations between components in the first multi-domain system; and computing a probability of successful transition along a path from a first state of the state machine associated with the first component to a second state of the state machine associated with the second component. The operations may further include: applying a threshold function to determine whether the probability of successful transition from the first state to the second state satisfies at least one threshold condition. The threshold function may be a composite threshold function based on at least two criteria in the multiple criteria.

The operations may further include: modeling a second multi-domain system including at least a third component from a third system; and generating a second performance metric that objectively evaluates capabilities of the second multi-domain system against the multiple criteria associated with the strategic objective. The second multi-domain system may further include the first component from the first system and the second component from the second system.

The operations may further include: performing a sensitivity analysis to objectively determine variability in the first performance metric based on projected variability of at least one input to the first multi-domain system.

In general, in one aspect, a method includes: obtaining multiple criteria associated with a strategic objective; determining that a first system, operating in a first operating domain, is only partially capable of satisfying a first criterion in the multiple criteria; determining that a second system, operating in a second operating domain that is different from the first operating domain, is capable of augmenting the first system with respect to satisfying the first criterion; responsive to determining that the second system is capable of augmenting the first system with respect to satisfying the first criterion, modeling a first multi-domain system including at least a first component from the first system and at least a second component from the second system; and generating a first performance metric that objectively evaluates capabilities of the first multi-domain system against the multiple criteria associated with the strategic objective.

Generating the first performance metric may include applying a merger function to generate a metric that indicates an extent to which merging capabilities of the first system with capabilities of the second system satisfies the first criterion. Generating the first performance metric may include: generating a state machine in which transitions between states represent integrations between components in the first multi-domain system; and computing a probability of successful transition along a path from a first state of the state machine associated with the first component to a second state of the state machine associated with the second component. The method may further include: applying a threshold function to determine whether the probability of successful transition from the first state to the second state satisfies at least one threshold condition. The threshold function may be a composite threshold function based on at least two criteria in the multiple criteria.

The method may further include: modeling a second multi-domain system including at least a third component from a third system; and generating a second performance metric that objectively evaluates capabilities of the second multi-domain system against the multiple criteria associated with the strategic objective. The second multi-domain system may further include the first component from the first system and the second component from the second system.

The method may further include: performing a sensitivity analysis to objectively determine variability in the first performance metric based on projected variability of at least one input to the first multi-domain system.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures:

FIGS. 4A-4F illustrate an example of system capabilities according to an embodiment;

FIGS. 5A-5D illustrate an example of a detailed trade study according to an embodiment;

FIG. 6 illustrates an example of a trade study summary according to an embodiment;

DETAILED DESCRIPTION

I. System Architecture

Figure 1:
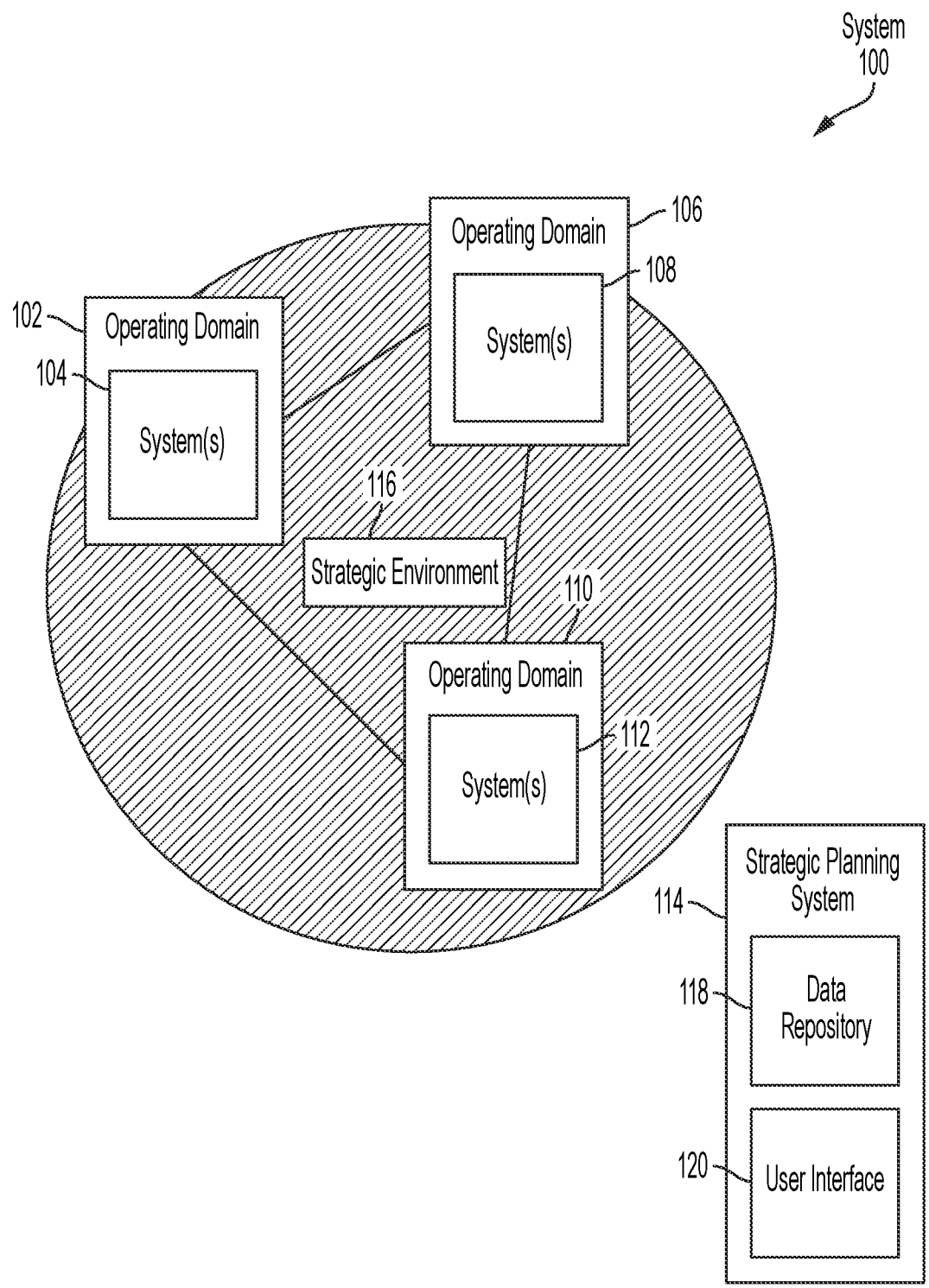
FIG. 1 is a block diagram of an example of a system according to an embodiment.

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The system 100 illustrated in FIG. 1 is a multi-domain system of systems. Specifically, in this example, one operating domain 102 includes one or more systems 104, another operating domain 106 includes one or more systems 108, and still another operating domain 110 includes one or more systems 112. One or more systems may be present (e.g., as separate instantiations and/or in terms of operative scope) in two or more operating domains. Alternatively or additionally, one or more systems may be domain-specific. For example, operating domain 102 may be an aeronautical domain that includes a system specific to aeronautical military operations. In this example, at least one system component in each of the operating domains 102, 106, 110 is able to communicate with at least one system component in each of the other operating domains 102, 106, 110. In other examples, communication from one domain to another may need to pass through a third domain. For example, there may not be any direct communication channel between operating domains 102 and 106, requiring communication between those domains to pass through operating domain 110.

In the example illustrated in FIG. 1, at least one system component in each of the operating domains 102, 106, 110 is physically and/or logically located within a strategic environment 116. A strategic environment 116 is a physical and/or virtual environment in which a particular strategic objective is to be pursued. For example, a strategic environment 116 may refer to one or more battlefields, one or more areas of cyberspace, a supply chain, an office space, and/or another kind of strategic environment or combination thereof.

In an embodiment, a strategic planning system 114 refers to hardware and/or software configured to perform operations described herein for integrating and evaluating capabilities of a multi-domain system according to an embodiment. Examples of operations for integrating and evaluating capabilities of a multi-domain system are described below.

The strategic planning system 114 may include a data repository 118. A data repository 118 may be any type of storage unit and/or device (e.g., a file system, database, collection of tables, or any other storage mechanism) for storing data. A data repository 118 may include multiple different storage units and/or devices. The multiple different storage units and/or devices may or may not be of the same type or located at the same physical site. Further, a data repository 118 may be implemented or may execute on the same computing system as one or more other components of the system 100. Alternatively or additionally, a data repository 118 may be implemented or executed on a computing system separate from one or more other components of the system 100. A data repository 118 may be logically integrated with one or more other components of the system 100. Alternatively or additionally, a data repository 118 may be communicatively coupled to one or more other components of the system 100 via a direct connection or via a network.

The strategic planning system 114 may include a user interface 120. A user interface 120 refers to hardware and/or software configured to facilitate communications between a user and a strategic planning system 114. A user interface 120 renders user interface 120 elements and receives input via user interface 120 elements. A user interface 120 may be a graphical user interface 120 (GUI), a command line interface (CLI), a haptic interface, a voice command interface, and/or any other kind of interface or combination thereof. Examples of user interface 120 elements include checkboxes, radio buttons, dropdown lists, list boxes, buttons, toggles, text fields, date and time selectors, command lines, sliders, pages, and forms. Different components of a user interface 120 may be specified in different languages. The behavior of user interface 120 elements may be specified in a dynamic programming language, such as JavaScript. The content of user interface 120 elements may be specified in a markup language, such as hypertext markup language (HTML), Extensible Markup Language (XML), or XML User interface 120 Language (XUL). The layout of user interface 120 elements may be specified in a style sheet language, such as Cascading Style Sheets (CSS). Alternatively or additionally, aspects of a user interface 120 may be specified in one or more other languages, such as Java, Python, Perl, C, C++, and/or any other language or combination thereof.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

II. Integrating and Evaluating Capabilities of a Multi-Domain System

Figure 2:
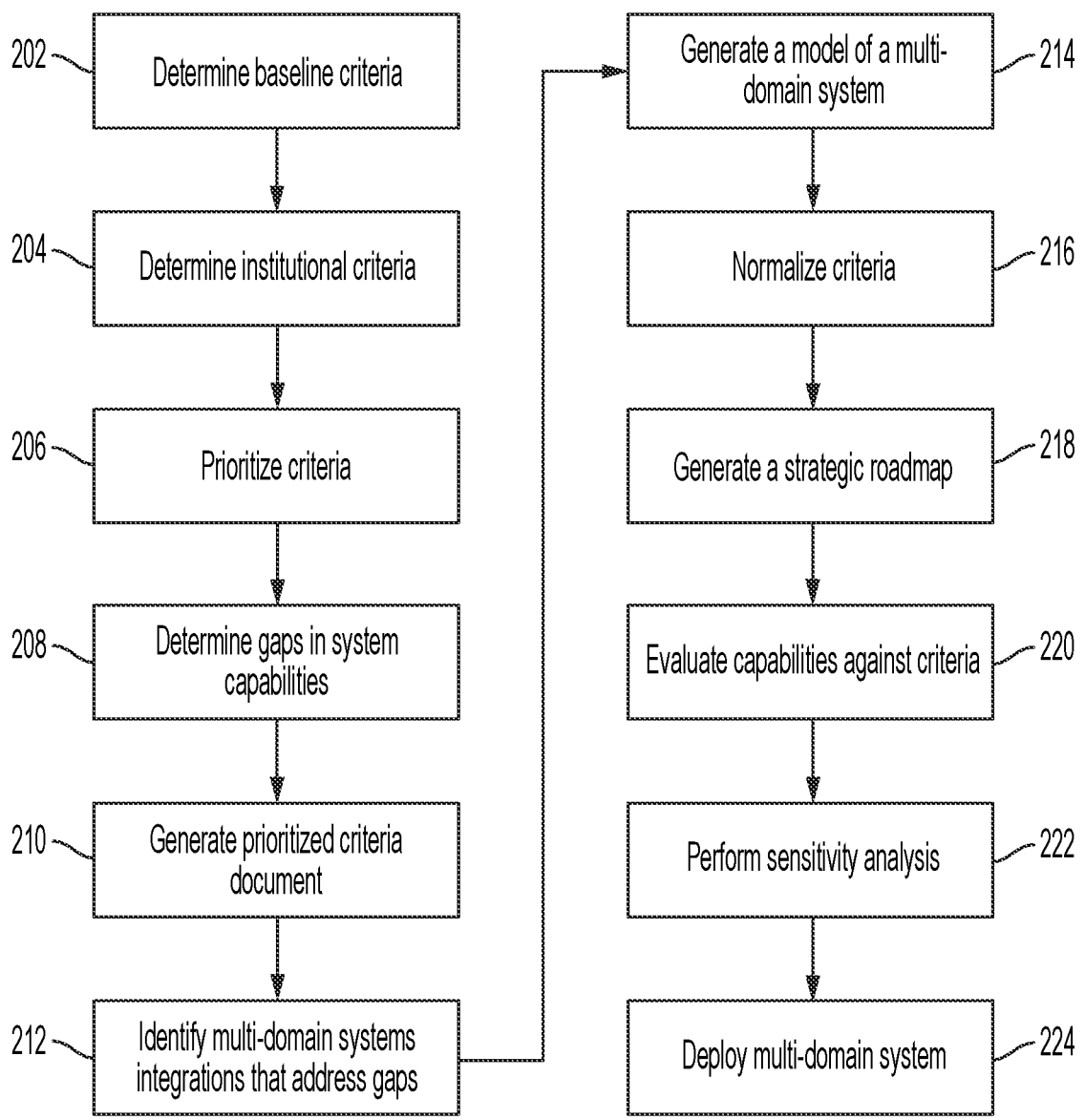
FIG. 2 is a flow diagram of an example of operations for integrating and evaluating capabilities of a multi-domain system according to an embodiment.

FIG. 2 is a flow diagram of an example of operations for integrating and evaluating capabilities of a multi-domain system according to an embodiment. One or more operations illustrated in FIG. 2 may be modified, rearranged, or omitted all together. Accordingly, the particular sequence of operations illustrated in FIG. 2 should not be construed as limiting the scope of one or more embodiments. In the following discussion, operations are discussed by way of certain examples. These examples are provided for illustrative purposes only and should not be construed as limiting the scope of one or more embodiments.

As illustrated in FIG. 2, baseline criteria are determined (Operation 202) for a strategic objective. Baseline criteria are key criteria associated with completion of the strategic objective itself and/or aspects of a system used to achieve the strategic objective. When systems integration and evaluation is being provided as a service to a customer (e.g., by a contractor to a government agency), baseline criteria may include criteria identified by the customer as key criteria or "care-abouts" for the strategic objective. For example, in the JADC2 context, baseline criteria may include products and programs that require course-of-action generation.

One or more baseline criteria may refer to general system features not tied to any specific instance of utilizing the system. For example, one or more baseline criteria may relate to one or more of: time to integrate; ease of integration; user experience/usability; analytics support; deployment flexibility; costs, modeling of assets at sufficient fidelity; course-of-action modeling availability; data architecture (e.g., ability to ingest and normalize data from multiple systems); etc. Each baseline criterion may be associated with one or more metrics corresponding to different levels of success. For example, with respect to time to integrate, a value of 10 may indicate minimal time to integrate, a value of 5 may indicate a medium time to integrate, and a value of 1 may indicate a high time to integrate. Intermediate values may also be supported. Additional examples are described below with respect to FIGS. 5A-5D and FIG. 6.

Determining baseline criteria may be based on user input (e.g., to a spreadsheet, database, etc.) designating the criteria and associated metrics. Alternatively or additionally, determining baseline criteria may be performed computationally, such as by machine learning and/or heuristics. For example, a machine learning model may be trained on prior strategic operations, including labeled data indicating which systems were used, how the systems were integrated, and whether each operation was considered successful. For a given strategic objective, the trained machine learning model may determine baseline criteria tending to be associated with successful outcomes.

In addition to baseline criteria, institutional criteria may be determined (Operation 204). As used herein, the term "institutional criteria" refers to criteria that are institutionally driven and not necessarily associated with the particular strategic objective. For example, an institutional criterion may relate to complying with a contractual obligation and/or achieving a high probability of winning (PWIN) a contract opportunity (for example, for a government contractor bidding on an opportunity to provide a multi-domain system with certain capabilities). As another example, an institutional criterion may reflect what level of independent research and development (IRAD) a government contractor is willing to support with respect to JADC2.

One or more institutional criteria may be determined by one or more business development executives (BDEs) and/or subject matter experts (SMEs). Alternatively or additionally, determining institutional criteria may be performed computationally, such as by machine learning and/or heuristics. For example, when bidding on a contract opportunity, a machine learning model may be trained on prior bids, including labeled data indicating cost, return on investment, net value, whether the contract bid was successful, etc. The trained machine learning model may determine institutional criteria tending to be associated with successful outcomes.

Baseline and/or institutional criteria may be prioritized (Operation 206) according to level of importance for stakeholders. For example, in the case of a government contractor bidding on a contract, dollar value and/or return on investment may take highest priority. In general, priorities may depend on who the stakeholders are and the nature of the strategic objective. Prioritizing criteria may be performed manually by one or more BDEs and/or SMEs. Alternatively or additionally, prioritizing criteria may be performed computationally, such as by machine learning and/or heuristics. For example, a machine learning model may be trained on prior projects, including labeled data indicating criteria used, priorities assigned to those criteria, etc. The trained machine learning model may determine priorities for criteria tending to be associated with successful outcomes.

Given a set of available systems for creating a multi-domain system, gaps in system capabilities may be determined (Operation 208). For example, a particular system may be able to fulfill only part of a strategic objective. Gap analysis determines the portion(s) of the strategic objective that the system is unable to fulfill. This process may be repeated for each system under consideration. Gap analysis may be criteria-specific, so that each system's ability to satisfy each criterion is determined independent of the other criteria.

A prioritized criteria document may be generated (Operation 210) that reflects the criteria, their respective priorities, and gaps in each system's abilities to fulfill those criteria. For example, the prioritized criteria document may be in the form of a spreadsheet and/or other human-readable document format. Multi-domain systems integration options may be identified that address gaps in individual systems (Operation 212). For example, if a system in one domain is only partially able to satisfy a criterion, another system in the same or another domain may be able to augment that system to satisfy the criterion. In some cases, three or more systems may need to be integrated to satisfy a criterion.

FIGS. 4A-4F illustrate an example of system capabilities according to an embodiment. The example shown in FIGS. 4A-4F is provided for illustrative purposes only and should not be construed as limiting one or more embodiments. Specifically, in this example, systems across multiple domains have different capabilities to satisfy criteria relating to course-of-action planning, threat analysis, execution scheduling, and long-term planning. Opportunities for augmenting gaps through integration with other systems are identified, and visual indicators (e.g., different kinds of shading) further indicate the technology readiness level (TRL) of each system.

Figure 15:
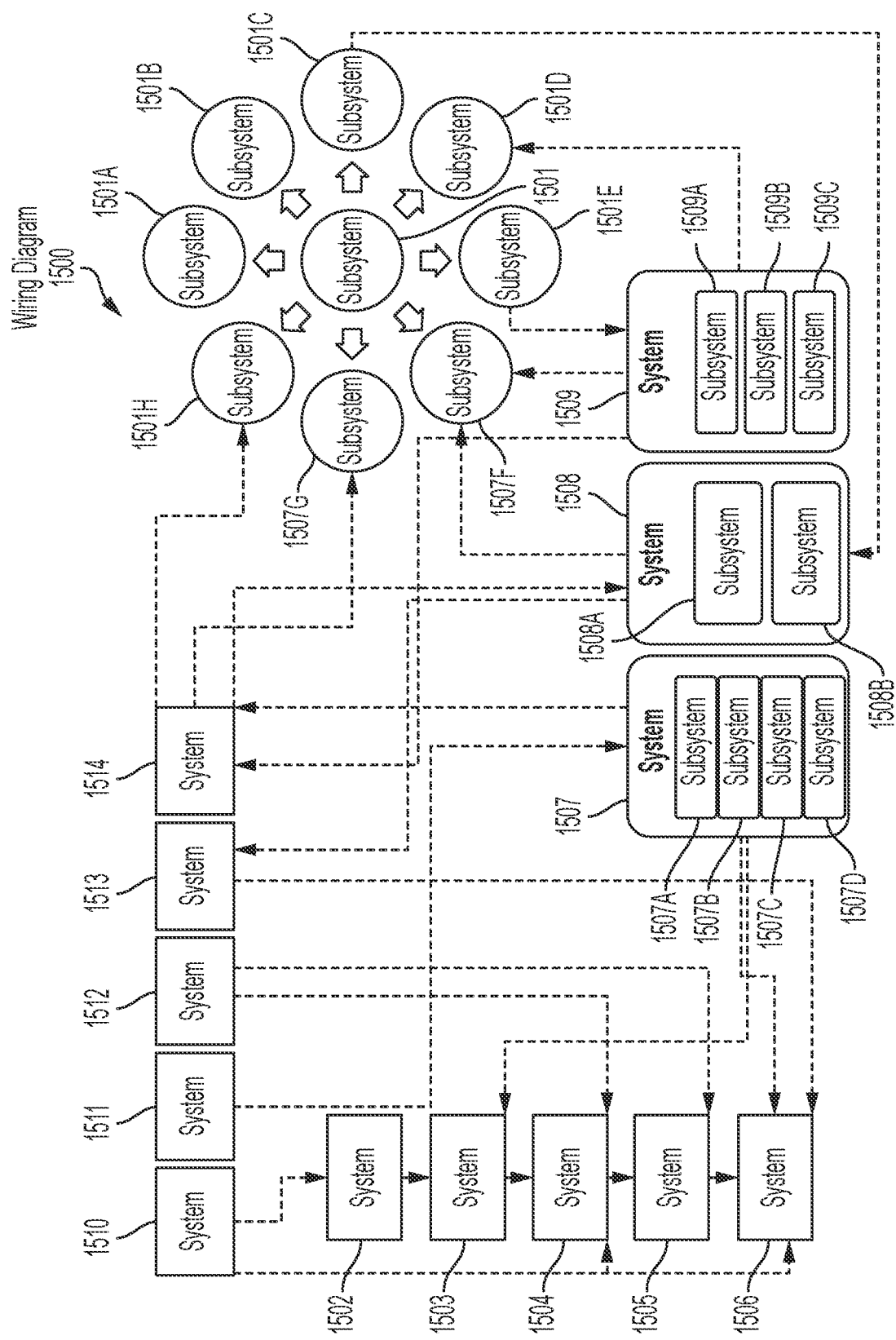
FIG. 15 illustrates an example of a wiring diagram according to an embodiment.

Returning to FIG. 2, a model of a multi-domain system may be generated (Operation 214) that shows integration opportunities between the different systems across domains. The model may be a digital model and/or a wiring diagram showing actual and/or potential connections (i.e., physical and/or logical connections) between components. For example, FIG. 15 illustrates an example of a wiring diagram 1500 according to an embodiment. The example shown in FIG. 15 is provided for illustrative purposes only and should not be construed as limiting one or more embodiments. In this example, the wiring diagram 1500 shows notional integration opportunities between systems (e.g., systems 1501, 1502, . . . 1514) and subsystems thereof (e.g., subsystems 1501A-1501H, 1507A-1507D, 1508A, 1508B, and 1509A-1509C), with arrows indicating the direction of flow of data; in other examples, some or all data flow may be bidirectional. Two or more systems and/or subsystems may be logically and/or physically located in two or more respective domains.

Returning again to FIG. 2, as initially gathered, some criteria may not be scored on a common scale. For example, some criteria may be scored on a scale of 1 to 5, while other criteria may be scored on a criteria of 1 to 10. To properly consider each criterion relative to the other criteria, the criteria may be normalized (Operation 216). For example, all criteria may be normalized to be scored on a scale of 1 to 10. Normalizing the criteria ensures that the same score or weight assigned to two different criteria has the same significance for each criterion.

In an embodiment, a strategic roadmap is generated (Operation 218). In general, a strategic roadmap may include plans for growing a particular area of business (for example, over a period of years from the present date, such as 3-5 years into the future). A strategic roadmap may include highly sensitive proprietary company information regarding new ideas and products that may be developed and integrated to meet projected customer needs and overcome competition. For example, in a JADC2 context, the strategic roadmap may range from high-level SoS wargaming to strategic dynamic decision assessment. A strategic roadmap may take the form of a labeled timeline, Gantt chart, list, mind map, flowchart, and/or some other representation of a forward-looking strategic plan.

Once the criteria are known and prioritized, systems capabilities are known, and opportunities for integration/augmentation are known, the capabilities of one or more multi-domain systems are evaluated against the criteria (Operation 220). Evaluating the capabilities of a multi-domain system against the criteria generates one or more objective metrics indicating a probability of success in satisfying the criteria if that multi-domain system were used. Different multi-domain systems may be evaluated, using different systems, system components, and/or integration paths. One or more metrics generated by evaluating multiple multi-domain systems against the criteria may identify a particular multi-domain system that has the highest probability of successfully satisfying the criteria. Evaluating one or more multi-domain systems against criteria may include one or more probabilistic evaluation techniques described in further detail herein.

One or more inputs to a multi-domain system may not be known in advance and/or may have a range of possible values. Alternatively or additionally, it may be useful to know how the probability of success varies when different weights are assigned to different criteria. Accordingly, a sensitivity analysis may be performed (Operation 222) to determine variability in the probability of success for a given multi-domain system, given variable inputs and/or criteria weights. Sensitivity analysis may include deriving confidence intervals using a Monte Carlo simulation.

Figure 3:
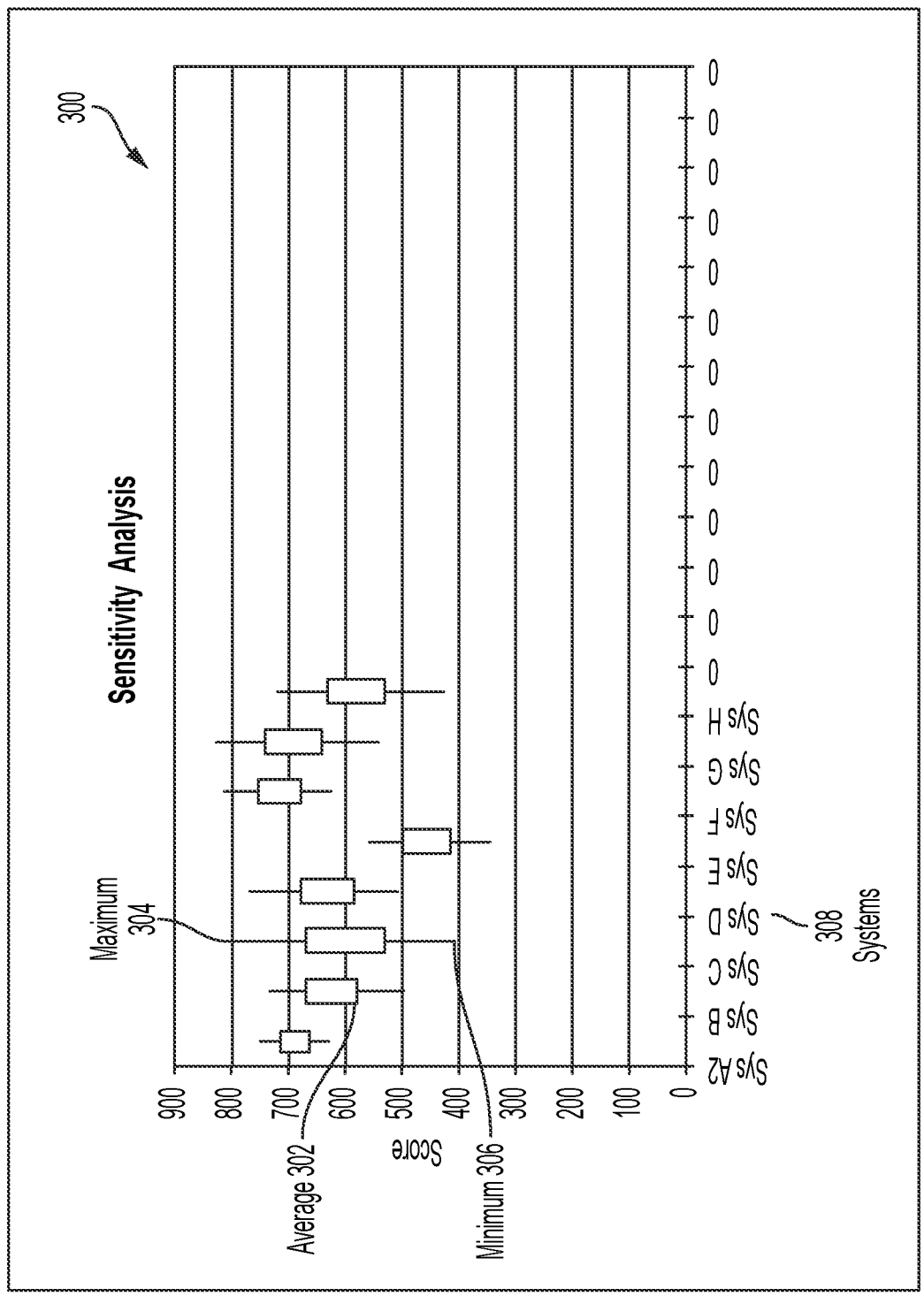
FIG. 3 illustrates an example of a sensitivity analysis according to an embodiment.
Figure 4F:
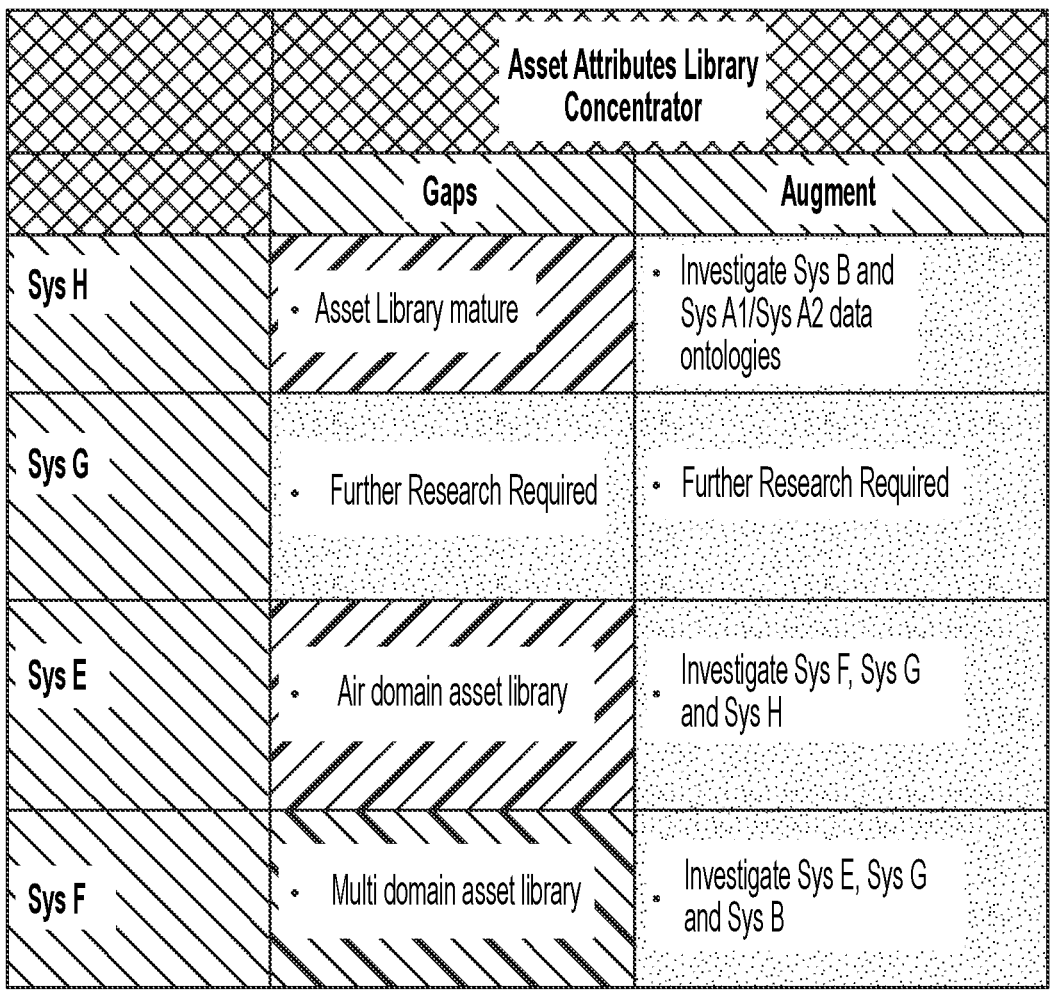
Figure 5A:
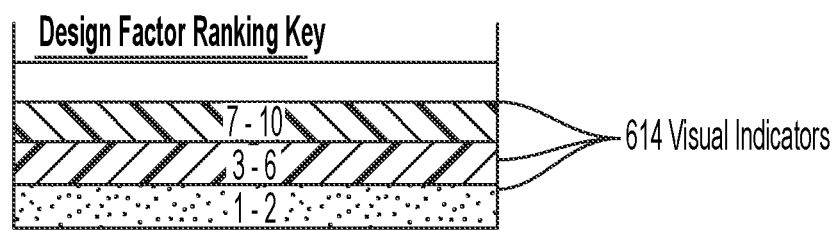

FIG. 3 illustrates an example of a sensitivity analysis 300 according to an embodiment. The example shown in FIG. 3 is provided for illustrative purposes only and should not be construed as limiting one or more embodiments. In this example, for each option 308, a range of possible outcomes is shown. The average 302 corresponds to an average value produced by the sensitivity analysis, plus or minus a standard deviation. The sensitivity analysis 300 further produces a maximum value 304 and a minimum value 306. Sensitivity analysis allows for consideration of best- and worst-case scenarios. For example, one option may have a slightly lower average probability of success than another option, but within a narrower range of probabilities.

Returning to FIG. 2, based on the results of evaluating one or more multi-domain systems and/or comparing the results of evaluating multiple multi-domain systems, a particular multi-domain system may be deployed (Operation 224). As described herein, deploying a multi-domain system may include proposing implementation of the multi-domain system as part of a contract bid. Alternatively or additionally, deploying a multi-domain system may include implementing the system and putting it to use in a multi-domain strategic environment.

Determining and evaluating integration options as described herein may help ensure that the multi-domain system that is deployed has the highest probability of success (according to the criteria considered in the analysis and their respective priorities) of all the options considered. Accordingly, approaches described herein may provide one or more of: reduced costs, reduced system redundancy, faster time to integration, generation of value-driven strategic roadmaps, and easier decision-making with respect to achieving strategic objectives.

In an embodiment, evaluating system capabilities against criteria can be represented as a trade study in which the different options can be objectively compared with each other. FIGS. 5A-5D illustrate an example of a detailed trade study 500 according to an embodiment. The example shown in FIGS. 5A-5D is provided for illustrative purposes only and should not be construed as limiting one or more embodiments. In this example, the trade study 500 includes multiple design criteria (for example, design criterion 502, "Time to Integrate"). Each option is assigned raw scores (e.g., score 604) indicating its capabilities with respect to each of the criteria. In this example, a raw score of 1 represents the worst performance for that criterion and a raw score of 10 represents the best performance for that criterion. The raw scores include visual indicators 614 (e.g., different kinds of shading) for ease of human viewing, and notes fields (e.g., note field 612) provide additional detail regarding each option's capabilities and gaps. Criteria weights (e.g., criterion weight 606) indicate the relative importance of each criterion, with 1 indicating the lowest importance and 10 indicating the highest importance. The raw scores are multiplied by their corresponding weights to obtain weighted scores (e.g., weighted score 608). The sums of the weighted scores for each option provide total scores (e.g., total score 610), indicating an objective metric of overall probability of success with respect to all criteria.

FIG. 6 illustrates an example of a trade study summary 600 according to an embodiment. The example shown in FIG. 6 is provided for illustrative purposes only and should not be construed as limiting one or more embodiments. In this example, the trade study summary 600 is a one-page summary of the example detailed trade summary illustrated in FIGS. 5A-5D, including the scores and visual indicators but omitting the detailed notes. The summary 600 provides, at a glance, an overview of the different options and their respective capabilities with respect to each criterion and overall probability of success.

III. Probabilistically Evaluating Multi-Domain System Capabilities

A. Example Operations Using a State Machine

Figure 7:
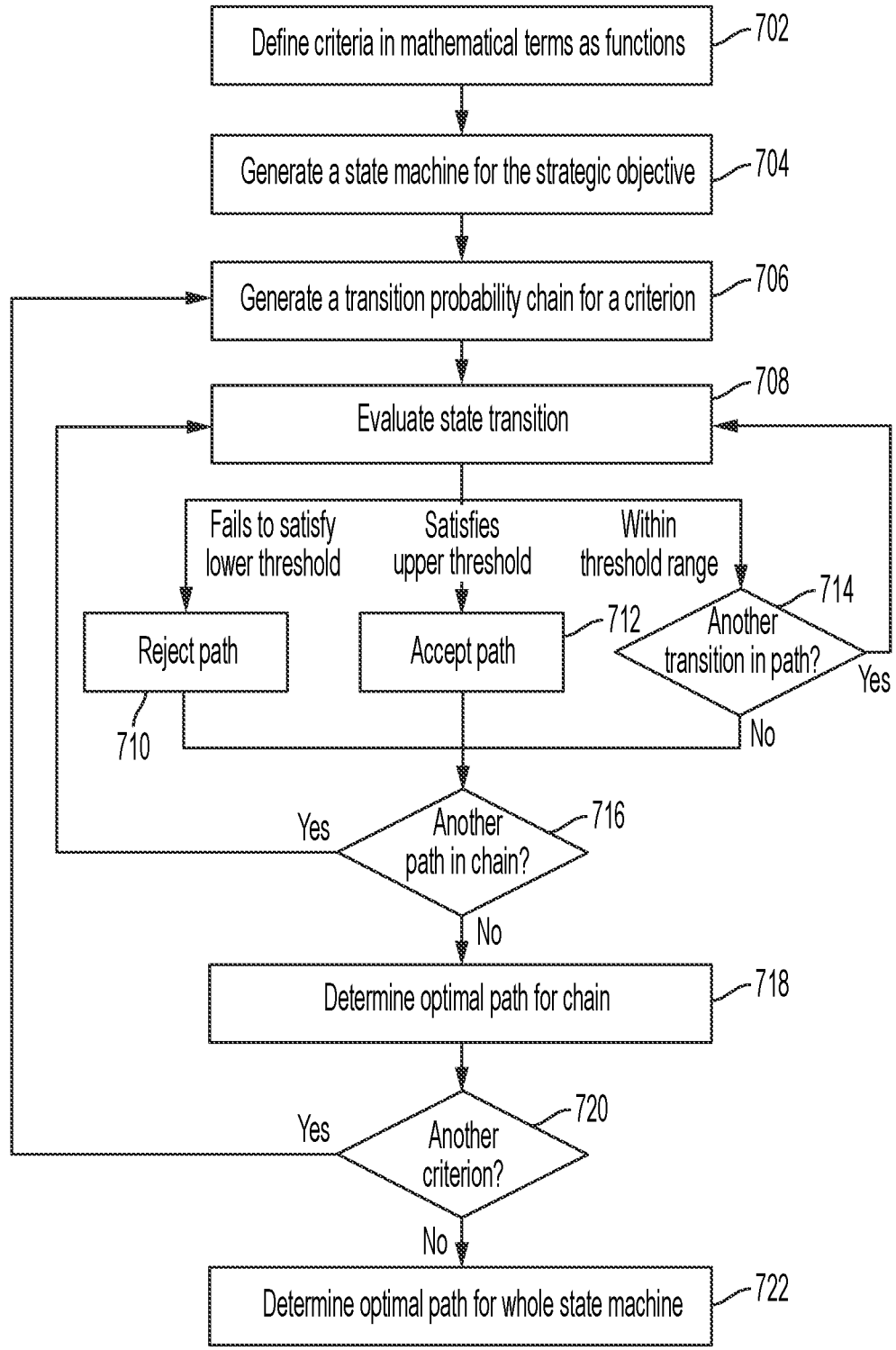
FIG. 7 is a flow diagram of an example of operations for probabilistically evaluating capabilities of a multi-domain system according to an embodiment.

FIG. 7 is a flow diagram of an example of operations for probabilistically evaluating capabilities of a multi-domain system according to an embodiment. One or more operations illustrated in FIG. 7 may be modified, rearranged, or omitted all together. Accordingly, the particular sequence of operations illustrated in FIG. 7 should not be construed as limiting the scope of one or more embodiments. In the following discussion, operations are discussed by way of certain examples. These examples are provided for illustrative purposes only and should not be construed as limiting the scope of one or more embodiments.

In an embodiment, a strategic planning system defines one or more criteria associated with a strategic objective (e.g., one or more baseline criteria and/or one or more institutional criteria as discussed above) in mathematical terms as functions (Operation 702). The criteria themselves, and the systems available to generate a multi-domain system, may be determined as described above.

The strategic planning system generates a state machine for the strategic objective (Operation 704). The state machine includes state transitions corresponding to integrations between two or more of the available systems. In some embodiments, the state machine includes multiple branches corresponding to different integration options, i.e., different combinations and logical orderings of the systems. For example, the strategic planning system may generate a state machine that includes branches corresponding to each possible ordered combination of systems. Alternatively, the strategic planning system may exclude some integration options. For example, one or more options may already be known to be non-viable, and accordingly may be excluded from the state machine.

In an embodiment, generating a state diagram includes generating a combination diagram of possible combinations of criteria and systems integrations. An example of operations for generating a state machine is discussed in further detail below.

For each criterion in the state machine, the strategic planning system generates a transition probability chain from the initial state to the terminal state (Operation 706). Each path in the chain represents a different integration path (for example, system A provides input to system B, which provides input to system C, etc.), in order to determine how well each path satisfies that criterion.

Beginning at the initial state in the state machine, the strategic planning system evaluates the state transition to a subsequent state (Operation 708). Specifically, the strategic planning system determines, as a function of the available data for each system, the probability of success toward the criterion when the system representing the start of the state transition is integrated with the system representing the end of the state transition. This function may be referred to as a "merger function," because it merges the systems' respective capabilities and produces an output that quantifies the probability of success. An example of a merger function is described in further detail below.

In an embodiment, evaluating the state transition further includes applying a threshold function to the output of the merger function. A threshold function is a function that determines, objectively, whether the probability of success at that point in the path satisfies one or more predetermined conditions for considering that path a viable option. An example of a threshold function is described in further detail below.

The predetermined condition(s) of the threshold function may include a lower threshold. If the probability of success fails to satisfy the lower threshold, the strategic planning system may determine that the path is non-operational (i.e., cannot satisfy the designated criteria regardless of the outcomes of any subsequent state transitions along the path) and reject the path that includes that transition (Operation 710) without evaluating any subsequent state transitions along the path.

Alternatively or additionally, the predetermined condition(s) of the threshold function may include an upper threshold. If the probability of success satisfies the upper threshold, the strategic planning system may determine with that path is operational (i.e., satisfies the designated criterion regardless of the outcomes of any subsequent state transitions along the path) and accept the path (Operation 710) without evaluating any subsequent state transitions along the path.

If the probability of success is in a range between the lower threshold and the upper threshold, the strategic planning system may continue evaluating subsequent state transitions (if any) along the path. Specifically, the strategic planning system may determine whether there are any subsequent state transitions along the same path (Operation 714). If so, the strategic planning system proceeds to evaluate the subsequent state transition(s) in the manner described above.

As noted above, a transition probability chain may include multiple possible paths. Upon completing evaluation of a path, the strategic planning system may determine whether there are any more paths in the chain left to be evaluated (Operation 716). If so, the strategic planning system may proceed to evaluate the next path as described above.

If there are no paths in the chain left to evaluate, the strategic planning system may determine an optimal path for the chain (Operation 718). Here, the word "optimal" is in reference to the other paths in the same chain. Specifically, the optimal path is the path in the chain corresponding to a systems integration determined to have the highest probability of success for the criterion, taking into account the probabilities of success for each state transition.

As noted above, multiple criteria may be associated with a strategic objective. The strategic planning system may determine whether there is another criterion for evaluation (Operation 720). If so, the strategic planning system generates a transition probability chain for that criterion and proceeds in the manner described above.

In an embodiment, operations described above result in evaluating multiple paths through the state machine for the entire multi-domain system, taking into consideration the designated criteria and systems available for integration. Based on the results of evaluating each path for each criterion, the strategic planning system may determine an optimal path through the state machine as a whole (Operation 722). This optimal path corresponds to a multi-domain system objectively determined to have the highest overall probability of success in satisfying the specified criteria using the available systems.

B. Generating a State Machine

Figure 8:
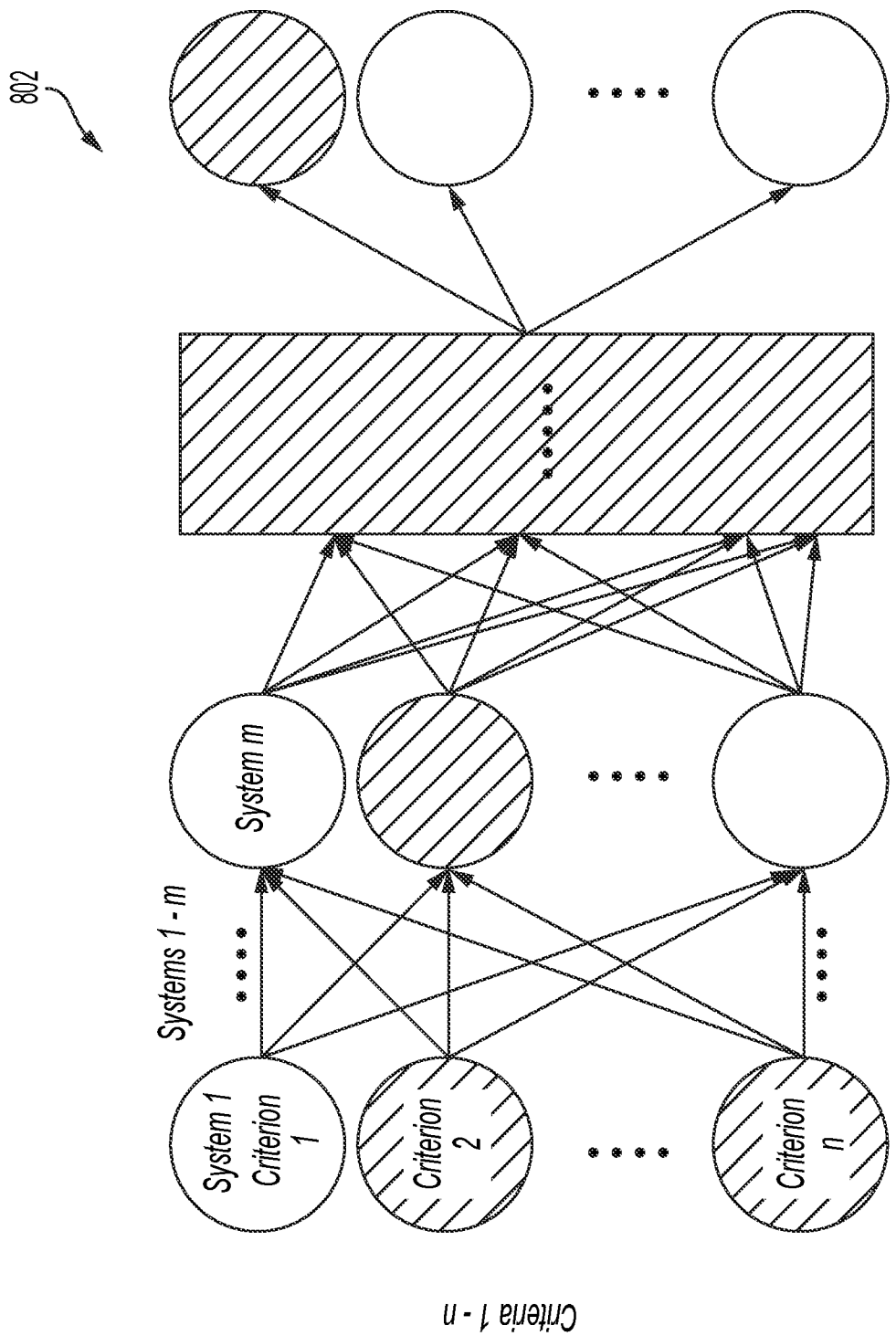
FIG. 8 illustrates an example of a decision-making process according to an embodiment.

As noted above, generating a state machine may include generating a combination diagram (i.e., data structure that can be conceptually visualized as a combination diagram) of possible combinations of criteria and systems integrations. FIG. 8 illustrates an example of a combination diagram 802 according to an embodiment. The example shown in FIG. 8 is provided for illustrative purposes only and should not be construed as limiting the scope of one or more embodiments.

Given n criteria, a strategic planning system may generate a combination diagram 802 that includes $2^n-1$ possibilities for criteria. For ease of illustration, in FIG. 8, some possibilities have been replaced with ellipses. In addition, given m systems to be considered within a particular criterion, the combination diagram 802 may include $2^m-1$ possibilities for systems (not shown in FIG. 8); this process may be repeated for each criterion. The state machine may include paths representing each possible combination of criteria, and each possible combination of available systems within each criterion. However, using merger and threshold functions as described herein means that some combinations may not be considered. For example, if the first step (i.e., state transition) of a particular combination yields a merger function value less than a combination previously considered, the lower-value combination may be summarily disregarded at the first step.

Single- or multiple-system integration may be possible in each state of the state machine. At a time t, a state $C_t$ may include multiple combinations of incremental systems integrations to achieve the desired capability. For example, five states may be included corresponding to five criteria/capabilities:

Threat analysis ($C_1$), which may include one or more mathematical characterizations of one or more threats (e.g., kinetic and/or non-kinetic threats) that can impose damage on a target for a given mission;

Decision Aids ($C_2$), which may include one or more computer programs and/or simulations that assist a human operator in making better (e.g., faster, more accurate, and/or more effective) decisions concerning one or more actions to be taken in a given mission;

Scheduled Asset Availability ($C_3$), which may indicate a time period when one or more assets (e.g., having kinetic and/or non-kinetic effects) is/are available to be applied to a threat for a given mission;

Real-Time Asset Availability ($C_4$), which may indicate the immediate moment, with respect to the current time, that one or more assets (e.g., having kinetic and/or non-kinetic effects) is/are available to be applied to a threat for a given mission; and Asset Attributes Library ($C_5$), which may include a data repository storing mathematical characterizations and descriptions of attributes of assets (e.g., effectors, sensors, platforms, and/or other assets providing kinetic and/or non-kinetic effects) that are available to be applied to a strategic objective—for example, to be applied to countering a threat for a given mission.

The strategic planning system may prioritize these states based on the corresponding capability priorities. For example:

$$C_4 \to C_3 \to C_5 \to C_1 \to C_2$$

Each of the capability states may be associated with a state transition from the present state to the next state(s) in the path. The probability associated with each transition may be defined by a corresponding merger function. Each of the state transitions may also be associated with a threshold function that determines whether the path is (a) operational and can continue towards the terminal state or (b) non-operational and should return to the initial state. The optimal path, i.e., the path having the highest probability of success, may be selected using the merger function and threshold function.

Figure 9:
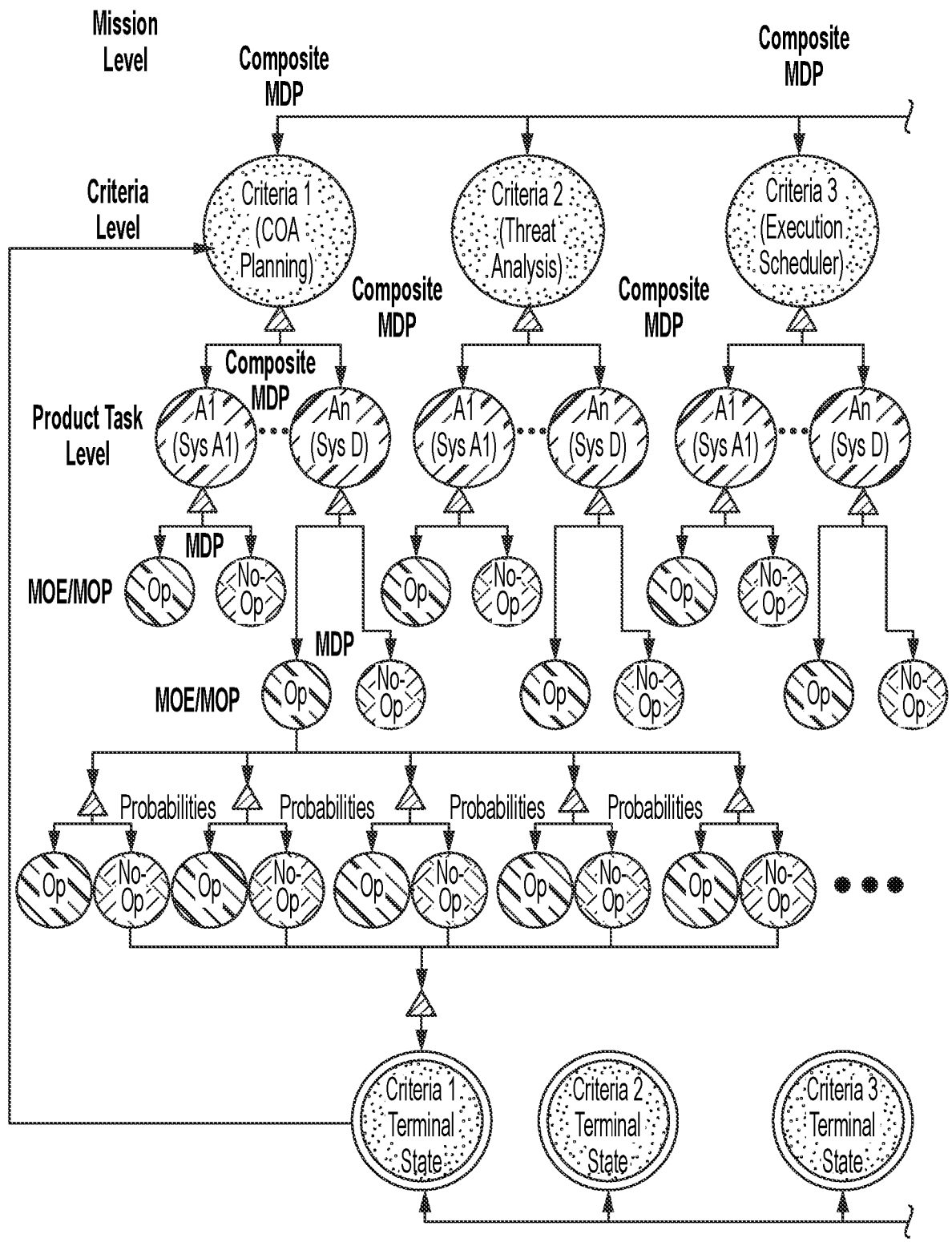
FIG. 9 illustrates an example of a multi-criteria state machine according to an embodiment.
Figure 9:
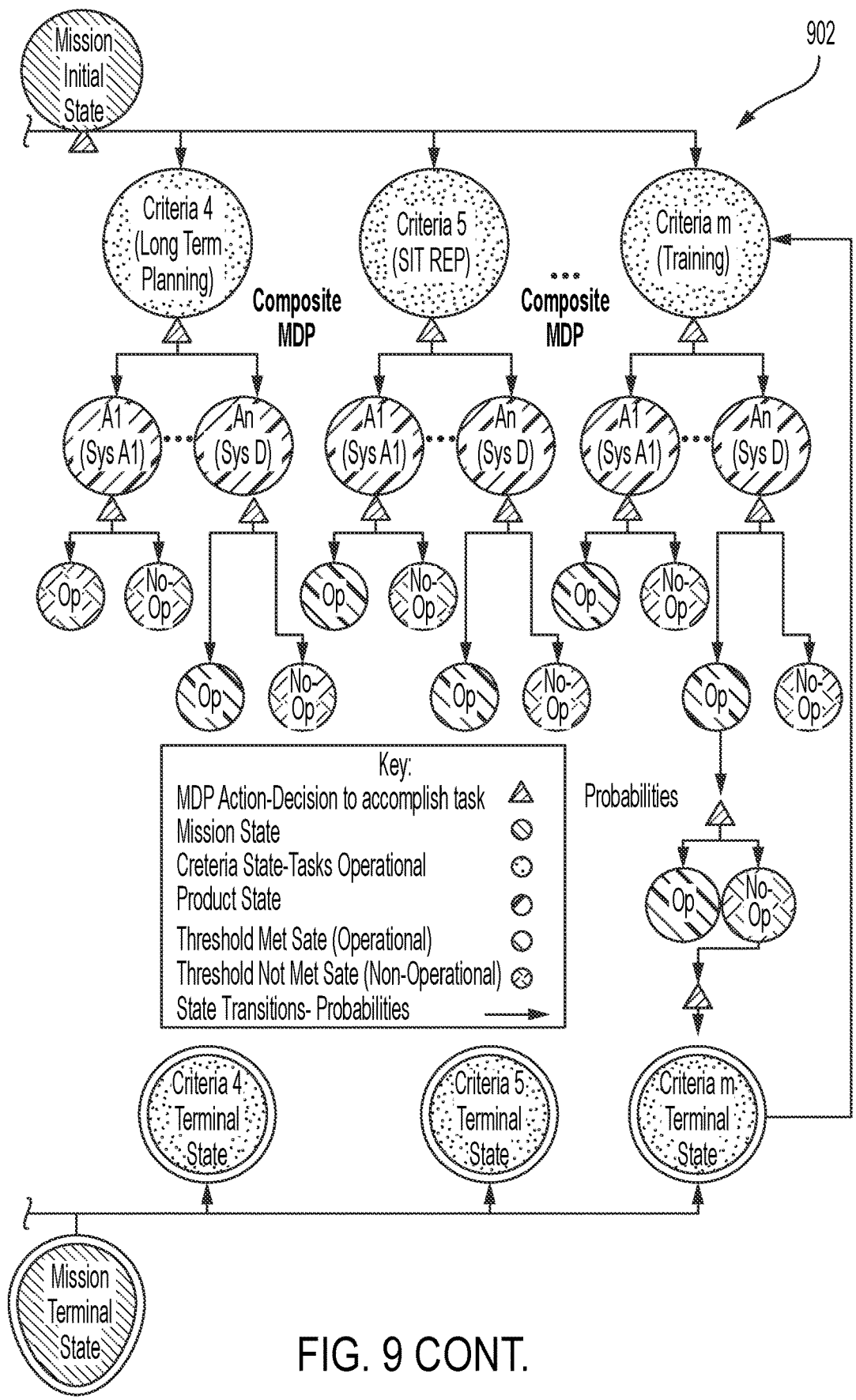

FIG. 9 illustrates an example of a multi-criteria state machine 902 according to an embodiment. The example shown in FIG. 9 is provided for illustrative purposes only and should not be construed as limiting the scope of one or more embodiments. In this example, the state machine 902 allows for decision-making using Markov decision processes (MDPs) at the mission (i.e., strategic objective), criteria, and product task (i.e., individual system capabilities) levels. Each path is associated with an objectively determined measure of effectiveness (MOE) and/or measure of performance (MOP) (e.g., using a merger function as described herein). Each path may further be designated as operative ("Op") or non-operative ("No-Op") (e.g., based on a threshold function as described herein).

C. Example Merger Function

Figure 10:
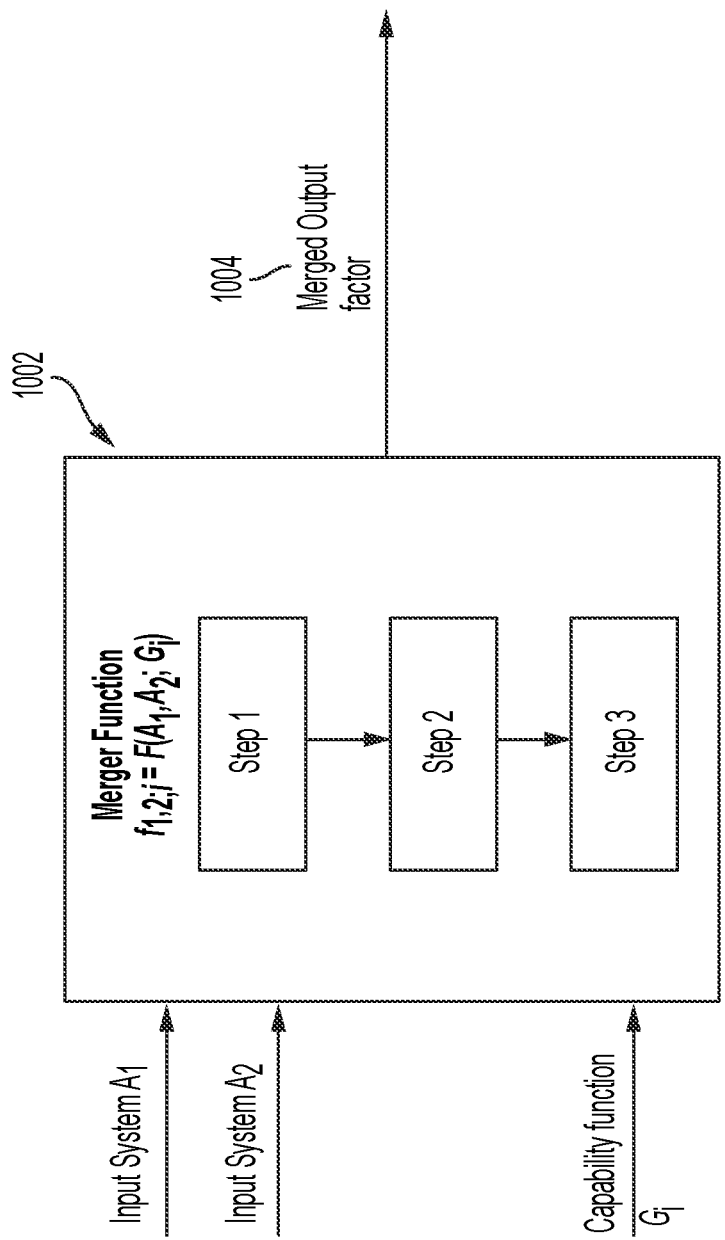
FIG. 10 illustrates an example of a merger function according to an embodiment.

FIG. 10 illustrates an example of a merger function 1002 according to an embodiment. The example shown in FIG. 10 is provided for illustrative purposes only and should not be construed as limiting the scope of one or more embodiments. Given two input systems $A_1$, $A_2$ and a capability function $\mathcal{G}_I$, the merger function 1002 computes a merged output factor 1004. The merged output factor 1004 represents the percent of the capability $\mathcal{G}_I$ that is realized by merging the capabilities of the two input systems $A_1$, $A_2$. Thus, the merged output factor 1004 provides an objective measure of the value of merging the capabilities of the two systems $A_1$, $A_2$. The merged output factor 1004 may be used as an input to a threshold function as described herein. Using this approach, tables 1006, 1008, 1010 show examples of merger functions for different systems integrations for the five capabilities/criteria discussed above with respect to FIG. 8. Computing these merger functions may yield values such as those shown in table 1316 of FIG. 13, discussed in further detail below.

D. Example Threshold Function

Figure 11:
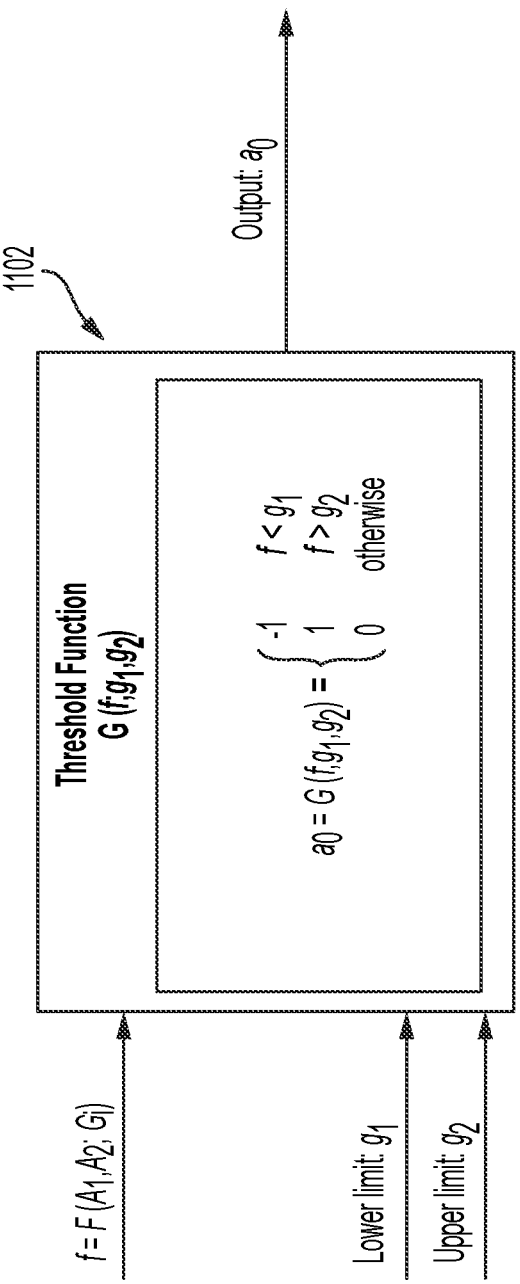
FIG. 11 illustrates an example of a threshold function according to an embodiment.

FIG. 11 illustrates an example of a threshold function 1102 according to an embodiment. The example shown in FIG. 11 is provided for illustrative purposes only and should not be construed as limiting the scope of one or more embodiments. Given a probability produced by a merger function $f$, a lower limit (i.e., lower threshold) $g_1$, and an upper limit (i.e., upper threshold) $g_2$, the threshold function 1102 produces one of three outputs $\alpha_0$: −1 indicating that the probability does not satisfy the lower threshold; 1 indicating that the probability satisfies the upper threshold; or 0 indicating that the probability is in the range between the lower and upper thresholds. Alternatively, a threshold function 1102 may produce another form of output. For example, a threshold function 1102 may produce numerical values other than −1, 1, and 0, string values (e.g., "low," "high," and "medium"), and/or another kind of value or combination thereof. In general, a threshold function 1102 produces output indicating whether the probability satisfies one or more threshold conditions.

E. Example Probabilistic State Transitions

Figure 12:
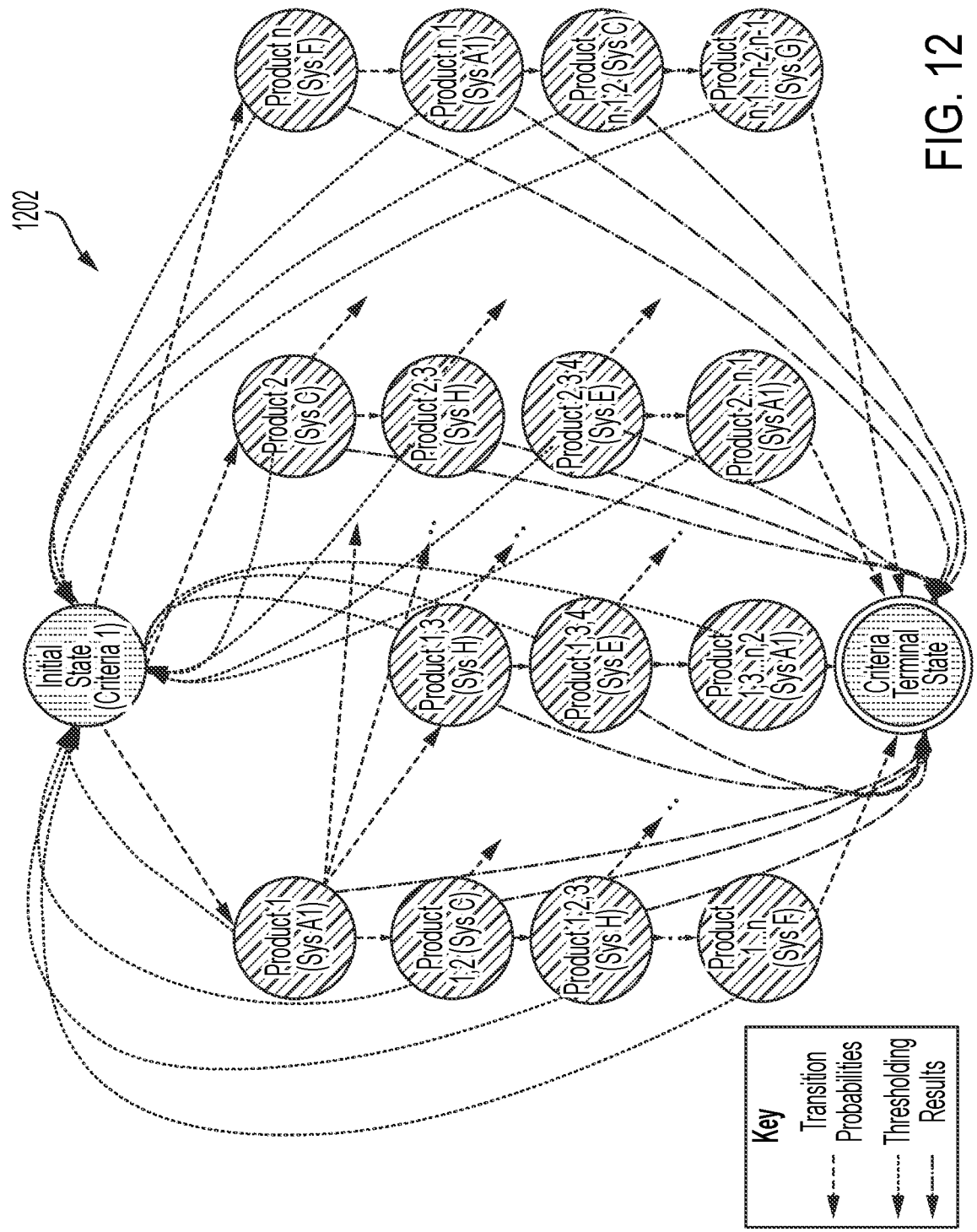
FIG. 12 illustrates an example of a probabilistic state transition diagram according to an embodiment.

FIG. 12 illustrates an example of a probabilistic state transition diagram 1202 according to an embodiment. The example shown in FIG. 12 is provided for illustrative purposes only and should not be construed as limiting the scope of one or more embodiments. The diagram 1202 shows transitions between states, where a merger function determines a transition probability (longer dashed lines) and thresholding (shorter dashed lines) uses a threshold function to produce a result (alternating dots and dashes) that determines whether to reject the path, accept the path, or continue evaluating subsequent state transitions in the path. As a result of these evaluations, the strategic planning system determines which system(s) provide the optimal results for each of the designated criteria, using the available systems.

F. Example Decision-Making Process

Figure 13:
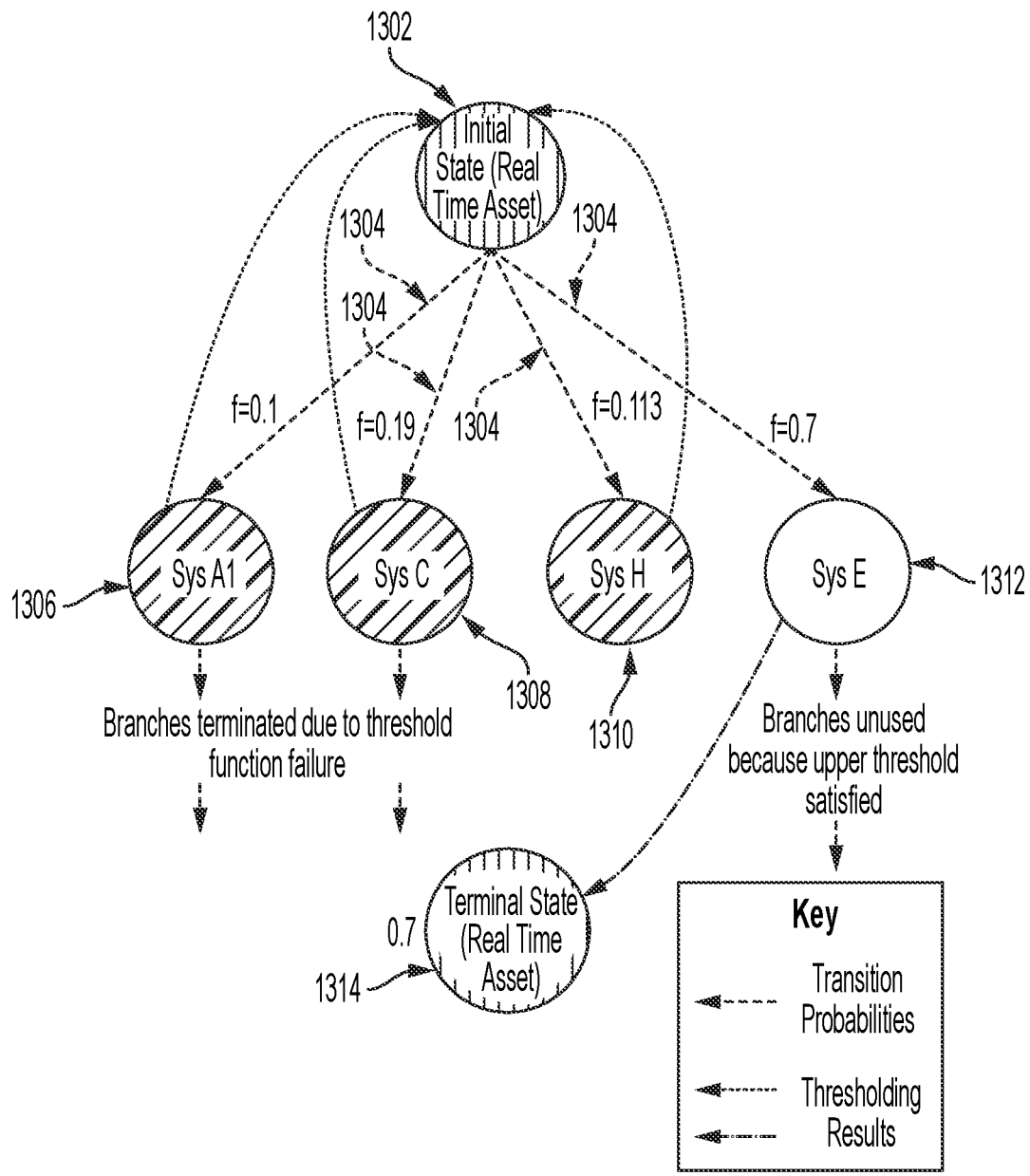
FIG. 13 illustrates an example of matching system capabilities to criteria according to an embodiment.

FIG. 13 illustrates an example of a decision-making process according to an embodiment. The example shown in FIG. 13 is provided for illustrative purposes only and should not be construed as limiting the scope of one or more embodiments. Specifically, FIG. 13 illustrates an example of a decision-making process using the example Real-Time Asset Availability, merger function, and threshold function discussed above with respect to FIGS. 8, 10, and 11. As shown in FIG. 13, decision-making for the Real-Time Asset Availability criterion starts at an initial state 1302. The threshold function has an upper threshold of 65% (0.65) realization and a lower threshold for a single step of 20% (0.20) realization. The five systems to be considered are Sys A1 1306, Sys C 1308, Sys H 1310, Sys E 1312, and Sys F (not shown). Column 4 of table 1316 shows results of the merger function; these results are supplied to the threshold function.

For Sys A1 1306, Sys C 1308, and Sys H 1310, the threshold function returns −1, indicating that all three fail to satisfy the lower threshold. If the strategic planning system considers the systems in the order shown, then it will terminate the paths in that order, before proceeding to evaluate the transition from the initial state 1302 to Sys E 1312. Sys E 1312 has a merger function value of 0.7, which satisfies the upper threshold of the threshold function (i.e., the threshold function returns a value of 1). Therefore, this path transitions directly to the terminal state 1314 with a final value of 0.7. In other words, the Real-Time Asset Availability criterion can be satisfied by Sys E 1312 alone, without integrating it with any other system. Sys F is excluded because its merger function value of 0.3 is less than 0.7; any path through Sys F would perform worse than Sys E 1312.

In an embodiment, this process is repeated for each of the five criteria discussed in the examples above. The results for this example are shown in Table 1:

TABLE 1

Example of Optimal Systems for Designated Criteria

| Criterion | System(s) | Number of Systems |
| --- | --- | --- |
| Real-Time Asset Availability | Sys E | 1 |
| Scheduled Asset Availability | Sys F | 1 |
| Asset Attributes Library | Sys F | 1 |
| Threat Analysis | Sys A1, Sys C, Sys E, Sys F | 4 |
| Decision Aids | Sys H, Sys F | 2 |

Based on the results of these evaluations, to satisfy the designated criteria, the optimal multi-domain system includes all five systems, each providing capabilities as shown in Table 1. Techniques described herein allow for decomposition of individual systems of systems into systems and/or subsystems, to identify the component(s) best suited to satisfy the overall strategic criteria. An integrated multi-domain system may be implemented by integrating the relevant results from individual systems and/or subsystems. Alternatively or additionally, system and/or subsystem components (e.g., software, hardware, and/or firmware) may be decomposed into functional models that may be combined to form a new product (which may initially be composed as a model or simulation) to produce specific results according to the given strategic criteria.

One or more embodiments are well suited for a variety of applications in the defense and/or commercial industries. Some non-limiting examples in the commercial space include:

1. Integrated models to respond to urgent disaster recovery situations. One or more embodiments may be used, for example, to support search-and-rescue operations such as searching for lost hikers in the wilderness, locate survivors of earthquakes and/or other natural or man-made disasters, support firefighters and/or other rescue personnel, etc., and/or proactively identify potential disasters (e.g., at nuclear power plants or oil refineries).
2. Integrated models to enhance oil and gas industry productivity. One or more embodiments may be used, for example, to isolate leaks in remote high-vegetation areas, detect mineral deposits. and/or to identify infrastructure (e.g., roads for transport).
3. Integrated models to find lost objects using multi-domain platforms: One or more embodiments may be used, for example, to locate lost objects (e.g., jets such as Malaysia Airlines Flight 370), locate objects in space, support asteroid prospecting, and/or detect meteors.
4. Integrated models to improve agriculture yield. One or more embodiments may be used, for example, to assess crops through electro-optical and infrared (EO/IR) sensors.
5. Integrated models to accelerate adoption of autonomous vehicles. One or more embodiments may be used, for example, to integrate sensor models and communications models used in autonomous cars, product delivery drones, and/or other autonomous vehicles.

IV. Disaster Recovery Example

In one non-limiting example provided for illustrative purposes, a system configured to assist with disaster recovery is used to find and recover a lost hiker in a national park in California. In this example, a method similar to that described with respect to FIG. 2 may be performed as follows:

1. Determine baseline criteria including time (urgency), location (geolocation), obstacles (e.g., terrain and weather), and available technology (e.g., sensors and multi-domain platforms).
2. Determine available assets including the local fire and rescue department, national park service, and other personnel (trained or untrained).
3. Determine priorities based on the situation, which in this example may be ordered as (from most to least important): time, location, obstacles, personnel, and available technology.
4. Identify gaps, such as the need for personnel with a particular type of search-and-rescue training and/or particular equipment on the scene.
5. Generate the priorities and provide them to the search team.
6. Identify multi-domain platforms needed to successfully conduct a search and achieve the goal (e.g., an unmanned aerial vehicle (UAV) equipped with EO/IR sensors, a helicopter, and/or a rugged terrain vehicle with a radio).
7. Generate one or more models that include the factors identified above (or integrate models already stored in an existing model repository for similar cases).
8. Ensure that all factors are normalized according to the criteria (e.g., that all participants are operating in Pacific Standard Time (PST)).
9. Generate a roadmap (e.g., a detailed plan) for how to accomplish the goal of recovering the hiker, given all the priorities and capabilities.
10. If one of the desired platforms is unavailable or not in service, or is not equipped with a needed sensor or rescue equipment, then fill the gaps with a capability from a neighboring district as soon as possible, because time is the top priority (i.e., criterion).
11. Before beginning the mission, run the integrated models with the above criteria and capabilities information multiple times (e.g., run a Monte Carlo simulation), to help ensure confidence and reparability in the results.
12. When confidence in the plan is sufficient, then execute the mission.

V. General; Computer Systems; Networks

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 14:
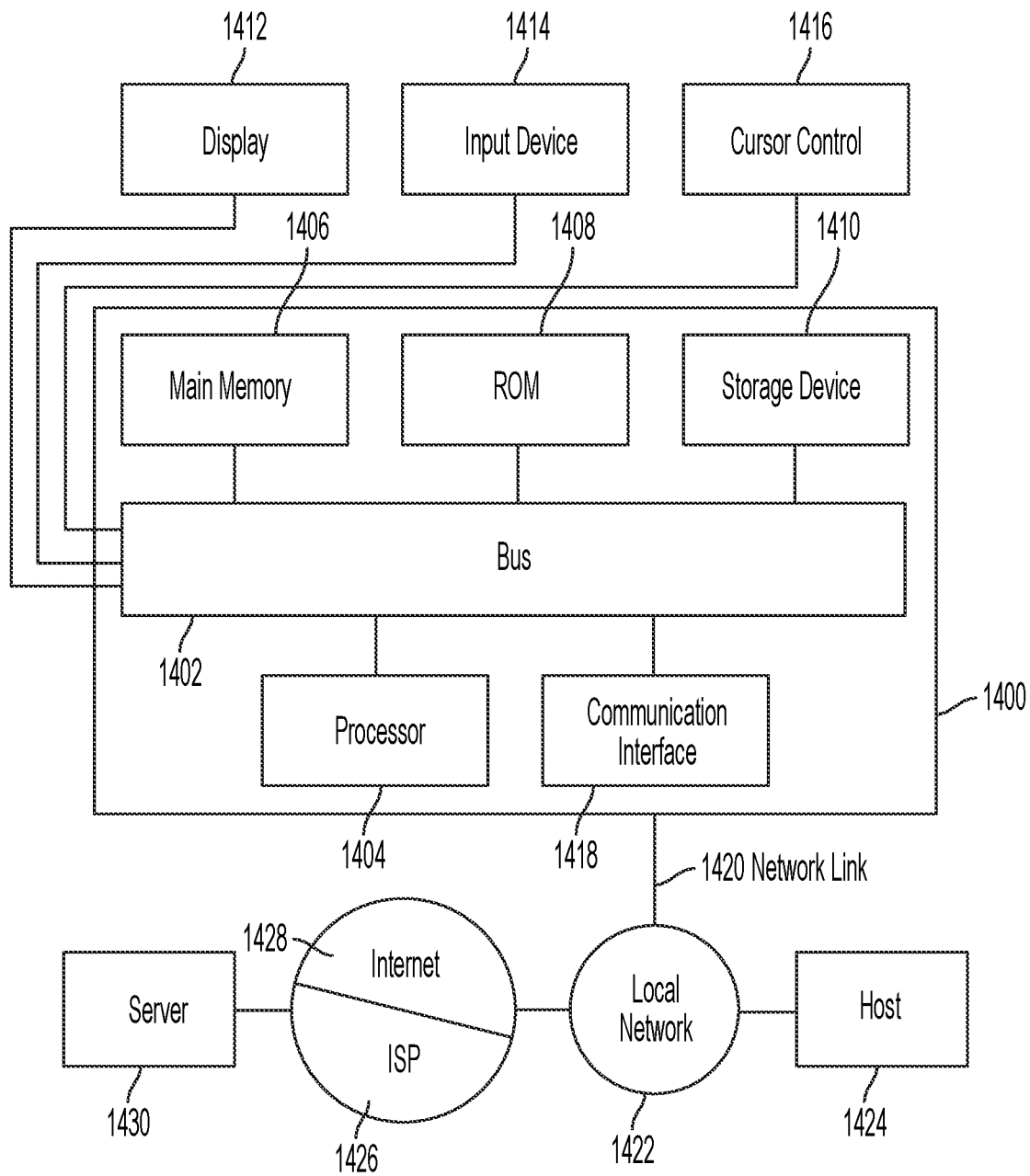
FIG. 14 is a block diagram of an example of a computer system according to an embodiment.

For example, FIG. 14 is a block diagram of an example of a computer system 1400 according to an embodiment. Computer system 1400 includes a bus 1402 or other communication mechanism for communicating information, and a hardware processor 1404 coupled with the bus 1402 for processing information. Hardware processor 1404 may be a general-purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in one or more non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a liquid crystal display (LCD), plasma display, electronic ink display, cathode ray tube (CRT) monitor, or any other kind of device for displaying information to a computer user. An input device 1414, including alphanumeric and other keys, may be coupled to bus 1402 for communicating information and command selections to processor 1404. Alternatively or additionally, computer system 1400 may receive user input via a cursor control 1416, such as a mouse, a trackball, a trackpad, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. Alternatively or additionally, computer system 16 may include a touchscreen. Display 1412 may be configured to receive user input via one or more pressure-sensitive sensors, multi-touch sensors, and/or gesture sensors. Alternatively or additionally, computer system 1400 may receive user input via a microphone, video camera, and/or some other kind of user input device (not shown).

Computer system 1400 may implement the techniques described herein using customized hard-wired logic, one or more ASICs or FPGAs, firmware, and/or program logic which in combination with other components of computer system 1400 causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 1402. Transmission media may also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 1400 may receive the data from the network and place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422, and communication interface 1418.

The received code may be executed by processor 1404 as it is received, and/or stored in storage device 1410, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network criteria for the computer network. Examples of network criteria include processing speed, amount of data storage, security criteria, performance criteria, throughput criteria, latency criteria, resiliency criteria, Quality of Service (QoS) criteria, tenant isolation, and/or consistency. The same computer network may need to implement different network criteria demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. One or more non-transitory computer-readable media storing instructions that, when executed by one or more processors, cause the one or more processors to perform operations comprising:
    obtaining a plurality of criteria associated with a strategic objective;
    determining that a first system, operating in a first operating domain, is only partially capable of satisfying a first criterion in the plurality of criteria;
    determining that a second system, operating in a second operating domain that is different from the first operating domain, is capable of augmenting the first system with respect to satisfying the first criterion;
    responsive to determining that the second system is capable of augmenting the first system with respect to satisfying the first criterion, modeling a first multi-domain system comprising at least a first component from the first system and at least a second component from the second system; and
    generating a first performance metric that objectively evaluates capabilities of the first multi-domain system against the plurality of criteria associated with the strategic objective.

2. The one or more non-transitory computer-readable media of claim 1, generating the first performance metric comprising:
    applying a merger function to generate a metric that indicates an extent to which merging capabilities of the first system with capabilities of the second system satisfies the first criterion.

3. The one or more non-transitory computer-readable media of claim 1, generating the first performance metric comprising:
    generating a state machine in which transitions between states represent integrations between components in the first multi-domain system; and
    computing a probability of successful transition along a path from a first state of the state machine associated with the first component to a second state of the state machine associated with the second component.

4. The one or more non-transitory computer-readable media of claim 3, the operations further comprising:
    applying a threshold function to determine whether the probability of successful transition from the first state to the second state satisfies at least one threshold condition.

5. The one or more non-transitory computer-readable media of claim 4, the threshold function being a composite threshold function based on at least two criteria in the plurality of criteria.

6. The one or more non-transitory computer-readable media of claim 1, the operations further comprising:
    modeling a second multi-domain system comprising at least a third component from a third system; and
    generating a second performance metric that objectively evaluates capabilities of the second multi-domain system against the plurality of criteria associated with the strategic objective.

7. The one or more non-transitory computer-readable media of claim 1, the operations further comprising:
    performing a sensitivity analysis to objectively determine variability in the first performance metric based on projected variability of at least one input to the first multi-domain system.

8. A system comprising:

at least one device including a hardware processor;

the system being configured to perform operations comprising:

obtaining a plurality of criteria associated with a strategic objective;

determining that a first system, operating in a first operating domain, is only partially capable of satisfying a first criterion in the plurality of criteria;

determining that a second system, operating in a second operating domain that is different from the first operating domain, is capable of augmenting the first system with respect to satisfying the first criterion;

responsive to determining that the second system is capable of augmenting the first system with respect to satisfying the first criterion, modeling a first multi-domain system comprising at least a first component from the first system and at least a second component from the second system; and generating a first performance metric that objectively evaluates capabilities of the first multi-domain system against the plurality of criteria associated with the strategic objective.

9. The system of claim 8, generating the first performance metric comprising:

applying a merger function to generate a metric that indicates an extent to which merging capabilities of the first system with capabilities of the second system satisfies the first criterion.

10. The system of claim 8, generating the first performance metric comprising:

generating a state machine in which transitions between states represent integrations between components in the first multi-domain system; and computing a probability of successful transition along a path from a first state of the state machine associated with the first component to a second state of the state machine associated with the second component.

11. The system of claim 10, the operations further comprising:

applying a threshold function to determine whether the probability of successful transition from the first state to the second state satisfies at least one threshold condition.

12. The system of claim 11, the threshold function being a composite threshold function based on at least two criteria in the plurality of criteria.

13. The system of claim 8, the operations further comprising:

modeling a second multi-domain system comprising at least a third component from a third system; and generating a second performance metric that objectively evaluates capabilities of the second multi-domain system against the plurality of criteria associated with the strategic objective.

14. The system of claim 8, the operations further comprising:

performing a sensitivity analysis to objectively determine variability in the first performance metric based on projected variability of at least one input to the first multi-domain system.

15. A method comprising:

obtaining a plurality of criteria associated with a strategic objective;

determining that a first system, operating in a first operating domain, is only partially capable of satisfying a first criterion in the plurality of criteria;

determining that a second system, operating in a second operating domain that is different from the first operating domain, is capable of augmenting the first system with respect to satisfying the first criterion;

responsive to determining that the second system is capable of augmenting the first system with respect to satisfying the first criterion, modeling a first multi-domain system comprising at least a first component from the first system and at least a second component from the second system; and generating a first performance metric that objectively evaluates capabilities of the first multi-domain system against the plurality of criteria associated with the strategic objective.

16. The method of claim 15, generating the first performance metric comprising:

applying a merger function to generate a metric that indicates an extent to which merging capabilities of the first system with capabilities of the second system satisfies the first criterion.

17. The method of claim 15, generating the first performance metric comprising:

generating a state machine in which transitions between states represent integrations between components in the first multi-domain system; and computing a probability of successful transition along a path from a first state of the state machine associated with the first component to a second state of the state machine associated with the second component.

18. The method of claim 17, further comprising:

applying a threshold function to determine whether the probability of successful transition from the first state to the second state satisfies at least one threshold condition, the threshold function being a composite threshold function based on at least two criteria in the plurality of criteria.

19. The method of claim 15, further comprising:

modeling a second multi-domain system comprising at least a third component from a third system; and generating a second performance metric that objectively evaluates capabilities of the second multi-domain system against the plurality of criteria associated with the strategic objective.

20. The method of claim 15, further comprising:

performing a sensitivity analysis to objectively determine variability in the first performance metric based on projected variability of at least one input to the first multi-domain system.

* * * * *